United States Patent
Man

(10) Patent No.: US 10,896,331 B2
(45) Date of Patent: Jan. 19, 2021

(54) MONITORING ACTIVITIES IN INDUSTRIAL SITES

(71) Applicant: indus.ai Inc, North York (CA)

(72) Inventor: Lai Him Matthew Man, North York (CA)

(73) Assignee: indus.ai Inc., North York (CA)

(*) Notice: Subject to any disclaimer, the term of this patent is extended or adjusted under 35 U.S.C. 154(b) by 0 days.

(21) Appl. No.: 16/129,699

(22) Filed: Sep. 12, 2018

(65) Prior Publication Data

US 2019/0236370 A1    Aug. 1, 2019

Related U.S. Application Data

(60) Provisional application No. 62/623,392, filed on Jan. 29, 2018.

(51) Int. Cl.
*G06Q 10/06* (2012.01)
*G05B 19/418* (2006.01)
*G06K 9/00* (2006.01)

(52) U.S. Cl.
CPC .... *G06K 9/00711* (2013.01); *G05B 19/41875* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 2015/0046363 A1* | 2/2015 | McNamara | G06Q 10/0635 705/333 |
| 2016/0342903 A1* | 11/2016 | Shumpert | G06F 11/079 |
| 2017/0314961 A1* | 11/2017 | Chen | G06F 17/18 |
| 2018/0053314 A1* | 2/2018 | Tsuji | G06T 7/215 |
| 2018/0183823 A1* | 6/2018 | Fadlil | G06N 20/00 |
| 2018/0219889 A1* | 8/2018 | Oliner | H04L 63/1425 |
| 2019/0080274 A1* | 3/2019 | Kovach | G06Q 10/0639 |

* cited by examiner

*Primary Examiner* — Kate H Luo
(74) *Attorney, Agent, or Firm* — Hickman Palermo Becker Bingham LLP; Malgorzata A. Kulczycka

(57) ABSTRACT

A computer-implemented method and system for monitoring activities in industrial sites using data models is presented. In an embodiment, a method comprises: using a computing device, receiving a plurality of data inputs from a plurality of data input devices in an industrial site; using the computing device, obtaining access to a data model that has been trained on training data for the industrial site and that is programmed to detect one or more anomalies associated with workers or equipment at the site; using the computing device, applying the plurality of data inputs to the data model and evaluating the data model with the data inputs to result in receiving output data specifying whether the plurality of data inputs indicates one or more anomalies occurring in the industrial site; using the computing device, in response to determining that the output data indicates a set of anomalies, of the one or more anomalies: generating a first set of notifications that corresponds to the set of anomalies occurring in the industrial site; for each first anomaly of the first set of anomalies: generating a first notification that includes a description of a first anomaly of the first set of anomalies; determining one or more first recipients of the first notification; transmitting the first notification to the one or more first recipients.

21 Claims, 11 Drawing Sheets

FIG. 3
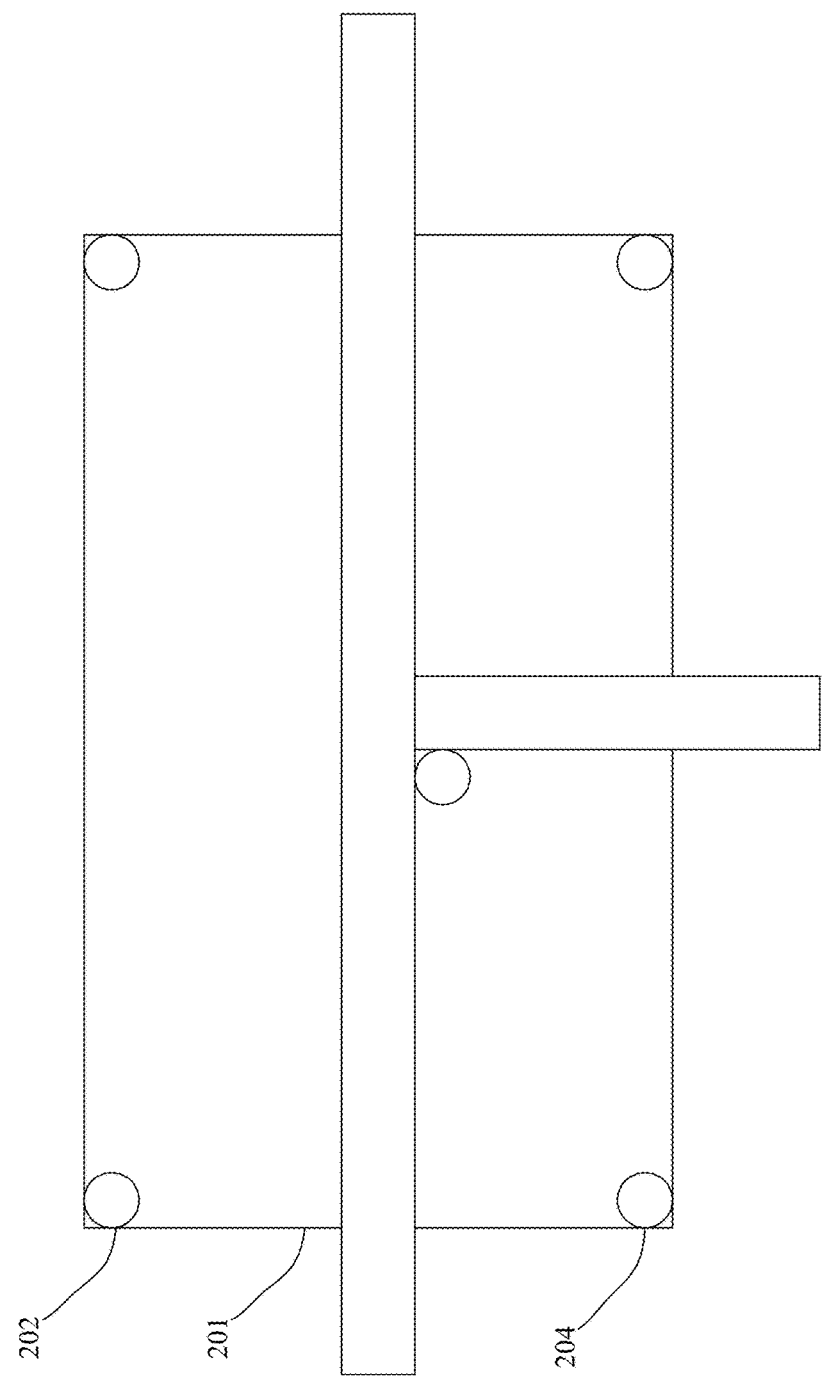
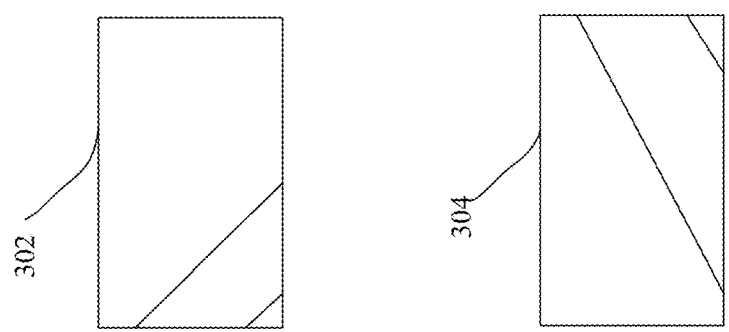

MONITORING ACTIVITIES IN INDUSTRIAL SITES

TECHNICAL FIELD

One technical field of the is methods to monitor and track persons, physical assets, and deliveries of parts and materials in industrial sites. Another technical field is computer-implemented machine vision. Yet another technical field artificial intelligence-based processing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Managing large industrial sites often includes considering safety, efficiency, and accountability of the persons present on the sites. This may also include considering efficiency and accountability of the activities taking place on the sites. In the context of an industrial site, the term safety refers to the safety of workers and pedestrians present on or near the industrial site; the term efficiency refers to the optimization of resources such as equipment assets; and the term accountability refers to the ability to validate the constructed product against the specification of the industrial project, and the accuracy in billing for the work done.

Managing large industrial sites may also include comparing the schedules for parts and materials deliveries with the actual needs. This may also include comparing the employee schedules with the workforce needs required to keep the projects on track.

Traditionally, safety and efficiency are enforced on industrial sites by managers and supervisors. However, the managers and supervisors cannot observe everything that happens on the sites all the time; especially, in large industrial sites in which many activities occur at the same time and which experience heavy traffic, loud noise and many distractions.

To assist managers and supervisors in monitoring industrial sites, some sites use digital cameras to collect video streams and images from the sites. However, since the cameras may collect vast amounts of images and the images may be in different formats, reviewing all the collected data may be tedious and time consuming.

Some industrial sites rely on computerized systems. The systems may include computer servers that communicate via communications networks with many different devices that collect data from the sites. But, due to the complexity and non-uniformity of the collected data, the computerized systems rarely provide the results in a timely fashion.

SUMMARY

The appended claims may serve as a summary of the invention.

BRIEF DESCRIPTION OF THE DRAWINGS

In the drawings:

FIG. 3 depicts a combined display of several video streams provided to a computer from several video cameras.

FIG. 11 is a block diagram that illustrates an example computer system with which an embodiment may be implemented.

DESCRIPTION OF EXAMPLE EMBODIMENTS

Figure 1:
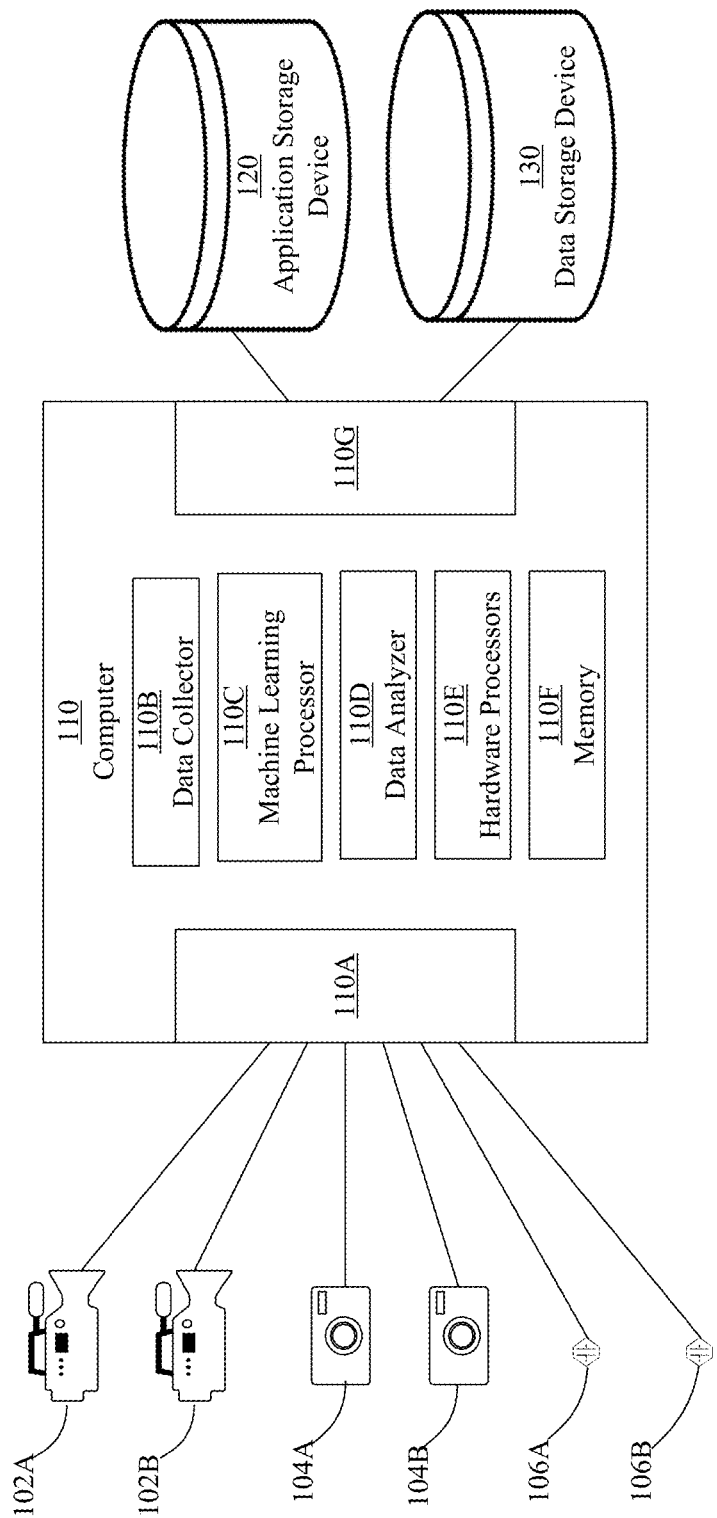
FIG. 1 illustrates an example computer system that may be used to implement an embodiment.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. OVERVIEW
2. EXAMPLE SYSTEM ARCHITECTURE
3. EXAMPLE DECISION SUPPORT SYSTEM
   3.1. EXAMPLES OF FUNCTIONS
      3.1.1. EXAMPLE CAMERA LOCATION SPECIFICATION
      3.1.2. EXAMPLE VIDEO STREAM DISPLAYS
   3.2. ADDITIONAL EXAMPLE FUNCTIONS
   3.3. TECHNICAL FEATURES
4. SYSTEM INTEGRATION AND TESTING
5. EXAMPLE WORKFLOW
6. SAFETY EVENT DETECTION
7. PERSONS AND EQUIPMENT DETECTION
8. EVENT DETECTION
9. EFFICIENCY DECISION SUPPORT
10. ACCOUNTABILITY
11. IMPROVEMENTS PROVIDED BY CERTAIN EMBODIMENTS 12. IMPLEMENTATION EXAMPLE—HARDWARE OVERVIEW
13. EXTENSIONS AND ALTERNATIVES

1. Overview

In an embodiment, a computer-implemented approach for monitoring activities in industrial sites is presented. In an embodiment, computer-implemented machine learning processes, statistical analysis, computer models, operations research models, and industrial domain analysis may be implemented in a distributed computer system executing as a decision support system. Examples of industrial sites with which embodiments can be used include construction sites, indoor industrial sites, outdoor industrial sites, underground industrial sites, and the like.

In an embodiment, a decision support system receives input data collected from an industrial site by specialized data collection devices. Examples of the data collection devices include video cameras, digital sensors, and other types of computer-based data collectors. The devices may be deployed at different locations of an industrial site and may be configured to collect data and transmit the collected data to a computer.

Some of the data collection devices may be equipped with computational resources sufficient to preliminarily analyze the collected data. After performing the preliminary analysis, the devices may transmit the analyzed data to a computer to perform additional analysis, such as the video analytics and data synthesis. Some complex computations may be performed in a cloud computing system.

Some of the data collection devices may be stationary, while others may be mobile. The stationary data collection devices may be mounted on, for example, poles, walls, gates, doors, ceilings, doors, and the like. The mobile data collection devices may be installed on, for example, tracks, trailers, conveyors, cranes, and the like.

The data collection devices may send the collected data to a computer via power cables and/or one or more communications networks, including Internet-based networks, local-area networks (LANs), wide area networks (WANs), and the like.

Upon receiving the collected data, a computer processes the data to generate output data. The processing may be performed using a machine learning approach, computer modeling, statistical analysis, and other types of data processing. The output data may include automated safety alerts, performance metrics, and records of activities provided for determining the status of the industrial projects.

In an embodiment, a decision support and data processing method for monitoring activities on industrial sites is configured to employ a machine learning approach to process the data received from a distributed network of sensors. The sensors may provide the data expressed in various data formats. The machine learning system may be programmed to process the collected data, and generate outputs that includes activity records, activity metrics, and activity-based alerts. The outputs may be used to generate warnings and alarms that may be used to deter safety violations, corruption, and inefficiencies in using mechanical equipment, industrial materials, and other resources. The warnings and alarms may be particularly useful in managing large-scale industrial sites.

In an embodiment, a decision support system is configured or programmed to generate visual or audible safety-related warnings and recommendations for industrial sites. The system may be configured or programmed to process collections of video streams captured by digital cameras from multiple camera views. It may also be configured or programmed to process sensor-based measurements and photographs captured by cameras. The collections may be provided to the decision support system to cause the decision support system to generate alerts and warnings. The alerts and warnings may be generated by applying, to the collected data, machine learning processing, computer vision processing, and event detection processing. The data processing of image data may be performed by specialized distributed systems that are configured to model industrial equipment.

In an embodiment, an approach for monitoring activities in industrial sites includes receiving video stream collections captured by multiple cameras. The collected video frames may be displayed on display devices to provide an enhanced level of situational awareness of the activities taking place in the sites. Displaying the multiple views helps monitoring whereabouts of the industrial workers and the industrial equipment. This may also include providing measures for improving safety, efficiency and accountability in the industrial sites, and efficiency in using the machines, materials, and other resources. Furthermore, this may include monitoring the persons as they enter and leave the industrial sites. This may also include using the collected data to verify the workers' timesheets, workers' overtime entries, and so forth.

2. Example System Architecture

FIG. 1 illustrates an example computer system that may be used to implement an embodiment.

In one embodiment, a computer system comprises components that are implemented at least partially in hardware, such as one or more hardware processors executing program instructions stored in one or more memories as described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 depicts a plurality of data input devices 102A, 102B, 104A, 104B, 106A, 106B, one or more computers 110, one or more application storage devices 120 and one or more data storage devices 130. Data input devices may include one or more video cameras 102A, 102B, one or more digital cameras 104A, 104B, and one or more digital sensors 106A, 106B. Although not depicted in FIG. 1, the data input devices may also include other devices, such as time-card sensors, audio devices, and others.

Data input devices may be configured to collect information about persons, objects and activities taking place in an industrial site. For example, video cameras 102A, 102B, may be configured or programmed to record video segments depicting persons, trucks, and cranes present in an industrial site, store the recorded video segments, and transmit the recorded video segments to computer 110. Digital cameras 104A, 104B may be configured or programmed to capture digital images. The images may depict, for example, persons, trucks, and cranes present in an industrial site. The images may be transmitted to computer 110.

Digital sensors 106A, 106B may be configured or programmed to detect events indicating entering or leaving the industrial site. The sensors may also associate the events with corresponding timestamps, store the associations between the detected events and the timestamps, and transmit the associations to computer 110.

Digital sensors 106A, 106B may include, for example, sensors that are configured to detect markings imprinted on or affixed to hard hats or other apparel that industrial workers wear. The markings may include, for example, quick response ("QR") codes that are imprinted on the hats, apparel or plates, color-coded stickers attached to the hard hats or vests, or tags affixed to apparel.

Color-coded stickers, or markers, attached to hard hats, or vests, may be used to identify workers present on an industrial site. Color-coded stickers may be either individual stickers or stickers combined with so called certified safety stickers. A certified safety sticker is a sticker that depicts a number, or code, assigned to the worker once the worker is successfully completed a worker orientation and has been certified to work on the job site. Both a color-coded sticker and a certified safety sticker may be combined into one sticker and used for two purposes: to identify a worker present on the industrial site and to indicate that the worker has been certified.

In an embodiment, color-coded stickers attached to hard hats, or vests, are used to count the worker trades, i.e., to count the workers per trade. Examples of trades include plumbers, electricians, carpenters, and so forth.

Hard hats that workers wear may also be color-coded, and different colors may be assigned to different worker trades. For example, plumbers may wear red hard hats, while electricians may wear blue hard hats.

Color-coded stickers and color-coded hard hats, or vests, may be used to count the workers and worker trades present on an industrial site. The counting may be performed in many different ways. For example, if different hard hat colors are assigned to different trades, then a count of worker trades may be computed based on the detected hat colors.

According to another example, if different sticker colors are assigned to different worker trades, then a count of worker trades may be computed based on the detected sticker colors.

According to other example, the counts may be computed as a combination of the hat colors and the sticker colors. For instance, if the plumbers wear red hard hats with white stickers, then a count of the plumbers present on the industrial site may be computed based on the detected red hard hats with white stickers.

According to other example, the counts may be computed as a combination of vest colors and the sticker colors. For instance, if the carpenters wear red vests with white stickers, then a count of the carpenters present on the industrial site may be computed based on the detected red vests with white stickers.

The sensors may also detect markings imprinted on plates of industrial trucks. The sensors may collect the information about the detected markings and transmit the collected information to computer 110 for processing.

Computer 110 is programmed to receive data collected by cameras and sensors, and process and analyze the received data. Once the collected data is processed, computer 110 may generate output that may include activity records, activity metrics, and activity-based alerts. The output generated by computer 110 may be used directly or indirectly to manage an industrial site. The output may include, for example, messages, warnings, and alarms indicating safety violations, corruption, or inefficiencies.

In an embodiment, computer 110 is part of a public or a private cloud system. Access to computer 110 may be secured using credentials. The credentials may be provided to a management team or a system administrator.

Alternatively, computer 110 may be a privately-owned computing device that is operated on behalf of a management team. It may be implemented within a local network managed by an industrial site or as an independent device outside the local network of the industrial site.

Computer 110 may be configured to execute a plurality of processes designed to monitor activities, machines, and persons. Computer 110 may also be configured to generate output which may include activity records, activity metrics, and activity-based alerts for an industrial site. Output generated by computer 110 may be in the form of warnings, alerts or reports. The warnings, alerts or reports may be used to deter safety and security violations, corruption, and inefficiencies in using machines, materials, or equipment.

In an embodiment, computer 110 includes an input interface 110A that is configured to receive data from data input devices, such as video cameras 102A, 102B, digital cameras 104A, 104B, and digital sensors 106A, 106B. Computer 110 may also include an output interface 110G for outputting data. Computer 110 may use output interface 110G to, for example, transmit the warnings and alarms to data storage device 130, from which, the warnings and alarms may be distributed to a management team.

Computer 110 may include a data collector 110B that is configured to receive data from input interface 110A. Data collector 110B may be also configured to translate the received data to a particular data format. For example, data collector 110B may be used to convert data from one format to another. If the data received from video camera 102A is in a format that is different than the format in which computer 110 reads the data, then data collector 110B may convert the data received from video camera 102A to the format that video camera 102B is using.

Computer 110 may further include a machine learning processor 110C configured to execute a machine learning program, algorithm, or process. The machine learning process may be executed using data provided by any of the data input devices 102A-B, 104A-B, and 106A-B. The machine learning process may be executed to enhance and improve the content of the received data. For example, machine learning processor 110C may be configured to process the data provided by the video cameras, digital cameras and sensors, and generate output in form of activity records, activity metrics, and activity-based alerts.

Computer 110 may also include a data analyzer 110D. Data analyzer 110D may be configured to execute a computer modeling approach, statistical analysis, computer modeling, and other types of processing to generate additional output data.

Computer 110 may also include one or more hardware processors 110E configured to execute instructions stored in memory 110F, and to cause instantiating of data collector 110B, machine learning processor 110C, and data analyzer 110D.

Computer 110 may be communicatively connected to application storage device 120 and data storage device 130. The communications between computer 110 and storage devices 120-130 may be facilitated by power lines, and/or one or more computer networks including, but not limited to, a Local Area Network (LAN), a Wide Area Network (WAN), the Internet, and a company private network.

Application storage device 120 may be configured to store program applications and instructions used by data collector 110B, machine learning processor 110C, and data analyzer 110D to process received data. Application storage device 120 may be used to store data format translators, neural network models, neural network parameters, specifications of the data input devices, default data models, statistical programs and functions to perform a statistical analysis, and the like.

Data storage device 130 may be configured to store data used and generated by computer 110. Data storage device 130 may be implemented in one or more hard disk drives, or other electronic digital data devices configured to store data. Data storage device 130 may include an individual device (as depicted in FIG. 1), or a plurality of storage devices placed in various locations (not depicted in FIG. 1). For example, data storage device 120 may be implemented in a plurality of nodes of distributed data networks.

Data storage device 130 may be implemented as a device separate from computer 110, as depicted in FIG. 1. Alternatively, data storage device 130 may be implemented as part of computer 110 or may be implemented within the same computer network as computer 110.

Data storage device 130 may include one or more databases such as relational databases, hybrid databases, columnar databases, and the like.

3. Example Decision Support Systems

In an embodiment, an approach for monitoring activities on an industrial site includes one or more decision support systems that are programmed or configured to model behavioral characteristics of objects identified in the site. The decision support systems may be implemented as part of machine learning processor 110C.

3.1. Examples of Functions

Functions of a decision support system may be defined by specifying inputs and outputs of the system; inputs may include heterogeneous-in-type, real-time data provided by multiple sources to the decision support system. The inputs maybe provided by video cameras, digital cameras and sensors deployed in an industrial site. The video cameras and digital cameras may have assigned their own IP addresses and may be part of a computer network.

In an embodiment, the inputs include specifications of the physical locations of the video and digital cameras deployed in an industrial site. The specifications of the physical locations may include physical addresses, names associated with the physical locations, and the like.

The inputs may also include data formats of input and output data. The inputs may specify, for example, the formats for video streams that the decision support system may process. The input may also specify the formats for recording the video stream in a time series format that is specific to the decision support system. Input may specify the format for storing the video stream in the time series format before the data is used to detect events depicted in the images included in the stream. Input may specify the events that are considered critical, and the actions that are to be pursued in response to detecting the events.

The inputs of the decision support system may also include specification of a data encoding format for the input data streams. Different encoding schemes offer different tradeoffs in terms of accuracy, errors, computational costs, and communications costs. In terms of accuracy, videos recorded in the 720p format provide a good visual accuracy; however, playing such videos may be expensive in terms of communications bandwidth, storage, power consumption, and computational processing time. On the other hand, using a low-quality format that is sufficient for archival purposes may be insufficient for the machine learning components of the decision support system because the machine learning components may require access to video streams that have high video quality.

3.1.1. Example Camera Location Specification

Figure 2:
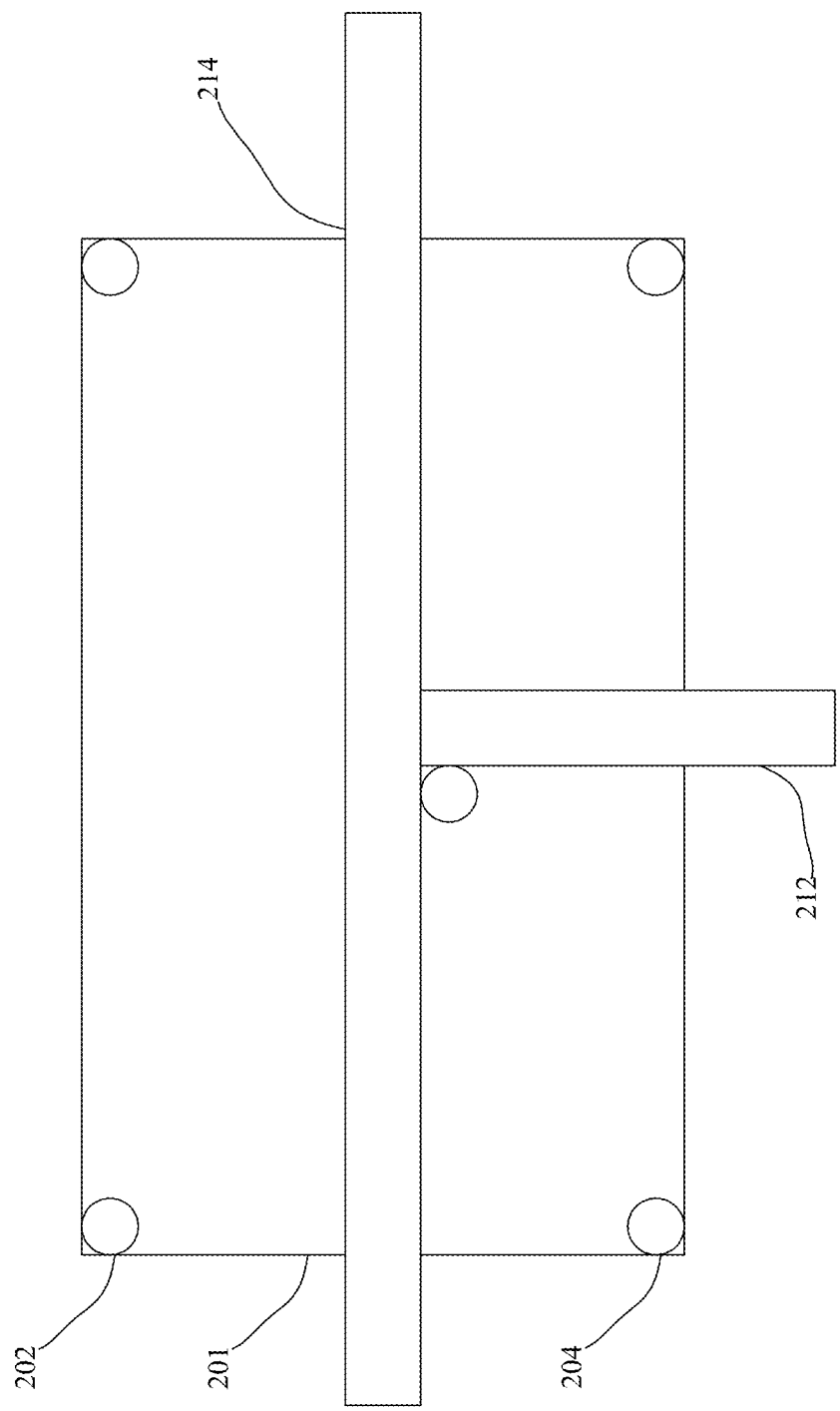
FIG. 2 depicts an example map showing an industrial site and locations of video cameras implemented in the site.

FIG. 2 depicts an example map showing an industrial site 201 and locations of video cameras implemented on the site. Example site 201 has a rectangular shape and has roads 212, 214.

In the depicted example, video cameras are shown using circles. Examples of the depicted video cameras are video cameras 202, 204. The locations for the cameras are selected to enable monitoring areas such as entrances, exits, restrooms, offices, delivery and receiving sites, and the like.

3.1.2. Example Video Stream Displays

FIG. 3 depicts a combined display 302, 304 of several video streams provided to a computer from several video cameras. Combined display 302, 304 may include a plurality of display regions, two of which are depicted in FIG. 3. Some of the display regions are used to display video streams from individual cameras, other display regions may be used to display a simplified map of locations of the individual cameras and the respective fields of view captured by the cameras.

Combined display 302, 304 includes the frames captured by a plurality of digital video cameras, including the frames captured by digital video cameras 202, 204. The frames may by synchronized using timestamps. Therefore, the frames displayed in combined display 302, 304 may correspond to the frames recorded at the same time.

3.2. Additional Functions

A decision support system may also be configured to generate outputs such as alarms, warnings, messages, and the like. The outputs may include specifications for displaying the alarms on computer dashboards of a management team in a timely fashion. The outputs may also include the specification for defining a size and a resolution for displaying the alarms on, for example, relatively small displays of portable devices such as smartphones.

Additional functions may also include specifications for grouping the alarms. The specifications may, for example, describe how to group the alarms based on corresponding levels of urgency. The levels of urgency may be determined based on characteristics of the alarms. For example, some alarms may be associated with non-critical events; other alarms may be associated with critical events and may require immediate actions.

Functions for outputs may also include generating a set of performance metrics. Performance metrics may be represented using key performance indicators ("KPIs"). A KPI may be used to measure, for example, efficiency of an industrial process in an industrial site over time. A KPI may be specified in terms of an amount of industrial material moved to and/or from an industrial site. Another KPI may be specified in terms of absenteeism of the workers.

As the video streams are provided to computer 110, a decision support system may analyze the KPIs to diagnose the sources and reasons for inefficiencies. For example, the decision support system may determine bottlenecks that are caused by failing to complete certain prerequisite industrial tasks.

Output functions may further include specifications for processing the received video and sensor data to determine accountability measures for an industrial site. The specification may include instructions for verifying, by authorized agents and personnel, the received data for accountability purposes. For example, the specification may describe how to analyze the received data to determine causes of accidents and losses, and how to audit the presence of contractors on the industrial site.

Output functions may also include specifications for processing the received data to determine accuracy measures for an industrial site. The specification may provide for detecting objects depicted in, for example, images provided for an industrial site. This may include detecting depictions of persons, materials, and machines in the images provided by video cameras and digital cameras to a decision support system. The specifications may relate to storage that computer 110 and data storage device 130 are expected to provide to the decision support system.

In an embodiment, the system features definitions of (1) the amount of accuracy to be achieved by various components of the system, (2) the ability to preserve the privacy of persons, (3) the speed with which the decision support system is expected to generate outputs, (4) the scalability of the system to a large number and a wide variety of different industrial sites (e.g., underground, indoor, outdoor), and (5) the cost of deploying and maintaining the decision support system.

3.3. Technical Features

In an embodiment, a decision support system is programmed or configured to process large amounts of data. To provide scalability, the data received from different cameras is analyzed in a distributed fashion across multiple devices. In an embodiment, this may include using a distributed computation system. Due to the real-time nature of the data streams, the storage capacity in memory may be addressed by deploying algorithms that are suitable for the streaming computational model.

In an embodiment, a decision support system is programmed or configured to process heterogeneous data received from different data sources. The analysis of data provided by heterogenic data sources may be performed by different components and at different time periods. Even a single data source may feed data into multiple components operating at distinct levels of detail. For example, data from a single source may be provided to the components configured to count persons and to the components configured to detect safety shortcomings. The outputs may be combined in an asynchronous fashion.

In an embodiment, a decision support system is programmed or configured to remain at least partially operational even if some of its parts or components fail.

In an embodiment, a decision support system is programmed or configured for maintaining a balance between analyzing the received data by local devices and analyzing the received data by a central server. Finding an optimal balance may include determining whether communications between the local devices and the central server have negative impact on the efficiency of the decision support system. Some communications between the local devices such as edge cameras, and computer 110 are performed for archiving video data. However, the object detection may be delegated to the local devices to reduce the communications cost. Finding the optimal balance may also include investigating and comparing the overall delay between detecting an object and processing of the information about the detected object.

Technical features of the decision support system may also include technical specification of the decision support system in terms of hardware and software specification for the system. This may include specifying a hardware-software configuration for computer 110 so that computer 110 is able to execute machine learning processor 110C, data collector 110B, and data analyzer 110D. This may also include providing technical specifications for video cameras, digital cameras, application storage device 120, and data storage device 130.

4. System Integration and Testing

Figure 4:
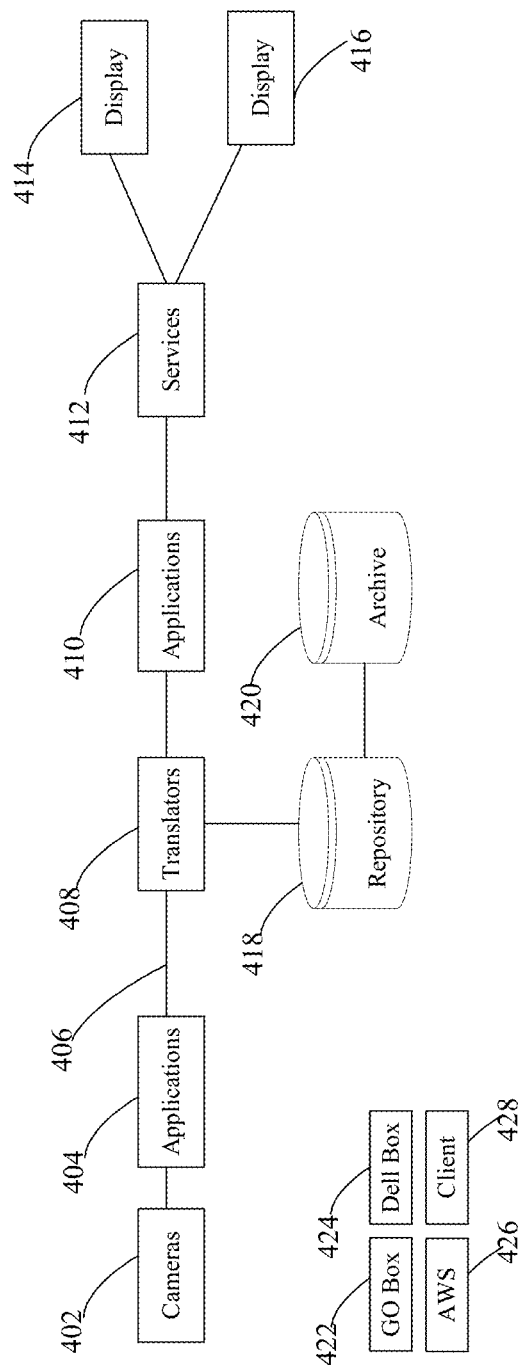
FIG. 4 depicts an example workflow integration of a decision support system.

FIG. 4 depicts an example workflow integration of a decision support system. The example illustrates various components of the decision support system that are integrated to support the data processing workflow. The depicted components include one or more cameras 402, one or more processing application 404, an input translation service 408, one or more processing applications 410, a web service 412, and a browser display 414. Output generated by processing application 404 may include one or more JPEG images. The images may be communicated to input translation service 408 via a UDP communications connection, or any other type of communications connection. In some embodiments, the components also include a browser thumbs and legacy display 416. The image files may be stored in an image files repository 418 and an image archive 420. Access to the decision support system may be provided from any of a GO Box 422, A Dell Box 424, an Amazon Web Services ("AWS") station 426, or any other client station 428.

In an embodiment, a decision support system integrates components that are configured to detect safety events, perform an efficiency analysis, and perform an accountability analysis. Outputs of the safety and efficiency components may be generated by integrating data from different sensors and by applying various algorithms to the integrated data.

In an embodiment, a decision support system is programmed to process received data at different time scales. For example, the safety event detection component may generate outputs in real-time with delays as short as possible. The accountability processing components may require receiving sensor measurements in near-real-time; such data may have to be stored in buffers and hard disks at a central server. In contrast, the component that analyzes the efficiency of the industrial work using many metrics only needs to generate outputs in retrospect. Executing the components that are not time-sensitive allows reducing the overall costs by delaying the analysis to time periods when there are no persons on the industrial site (e.g., at night and/or during holidays). This is possible using the same data that is stored in the central server for accountability purposes.

Multiple rounds of testing of the individual components may be interleaved with the processing performed by the individual component. The components may be tested by executing test cases selected by domain experts from an industrial site. Based on the testing results, the components may be tuned, and eventually integrated into a decision support system. The testing may include testing the overall system with respect to the functions of accuracy, privacy, speed, and scalability. The testing may also include testing the usability of the system by end users, and the system's resilience to partial failures of components and sensors.

5. Example Workflow

Figure 5:
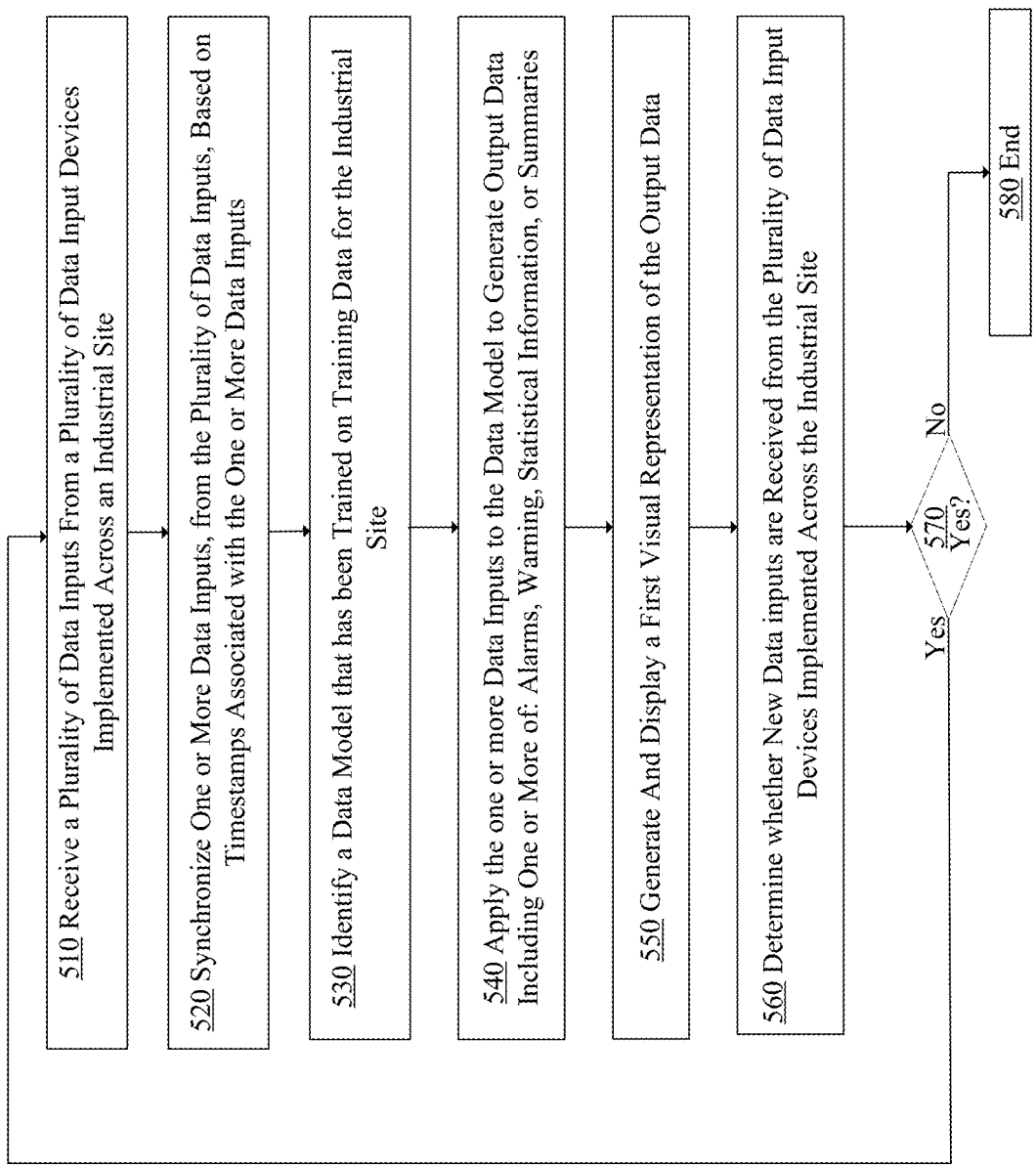
FIG. 5 depicts an example workflow executed by a decision support system.

FIG. 5 depicts an example workflow executed by a decision support system. FIG. 5, and each other flow diagram in this disclosure, is intended to describe an algorithm or functional process that can be used as a basis of preparing one or more computer programs for the environment of FIG. 1. Furthermore, FIG. 5 is expressed at the same level of detail that is typically used by persons of ordinary skill in the art, to which this disclosure pertains, to communicate among themselves about and understand the general plans, specifications, and algorithms that they will later be capable of using to define specific code, instructions or other details of programming the system of FIG. 1 or other computing elements of the environment of FIG. 1.

In step 510, the decision support system receives a plurality of data inputs from a plurality of data input devices implemented across an industrial site.

In step 520, the decision support system synchronizes one or more data inputs, from the plurality of data inputs, based on, for example, timestamps associated with the one or more data inputs.

In step 530, the decision support system identifies a data model that has been trained on training data for the industrial site.

Figure 7:
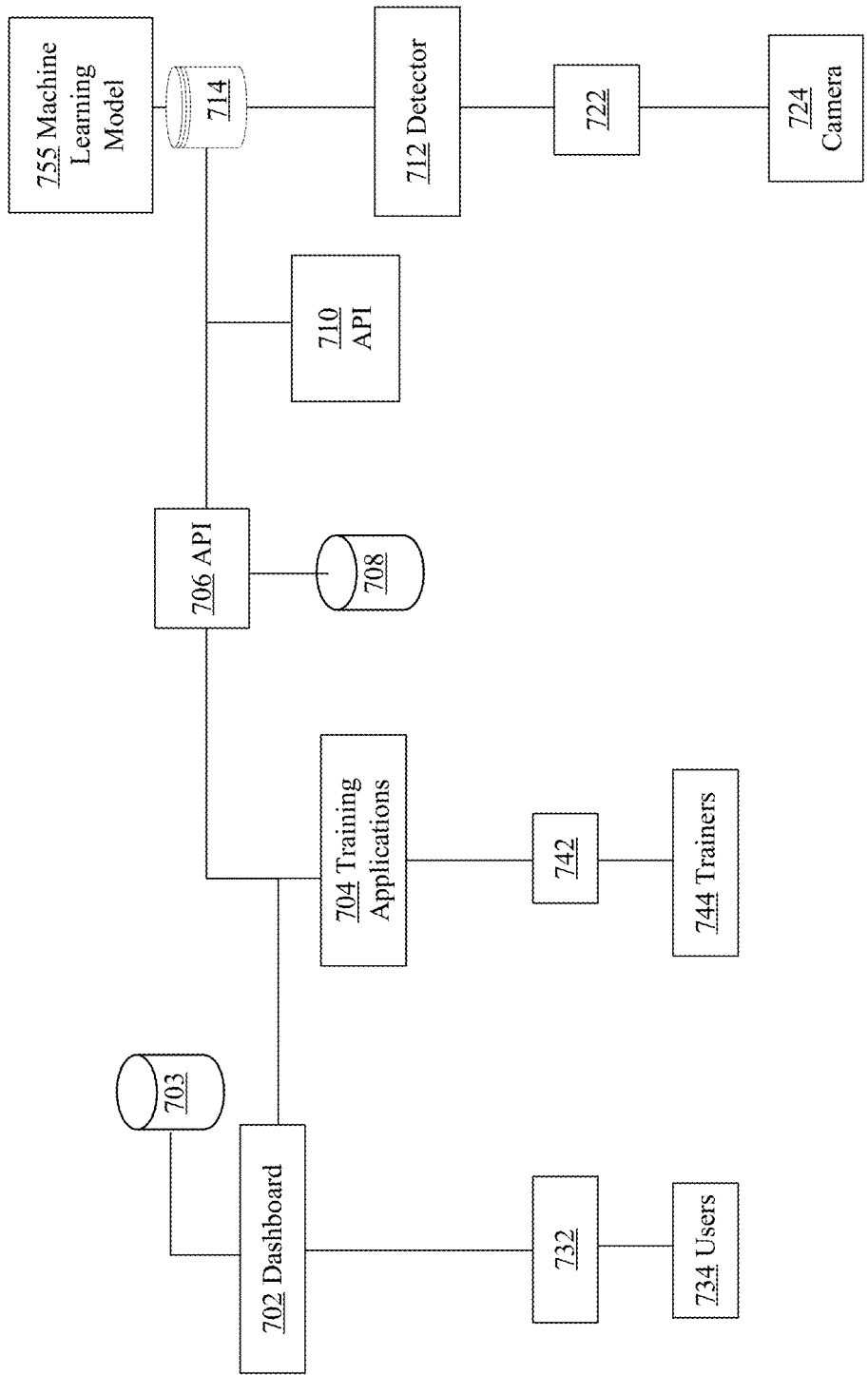
FIG. 7 depicts an example diagram for training a machine learning system.

FIG. 7 depicts an example diagram for training a machine learning system. The depicted training process may be initialized by trainers 744, who communicate with training applications 704 via, for example, an Internet-based network 742. The training applications 704 may be configured to access a machine learning API 706. Machine learning API 706 may be also configured to retrieve data from an object detection database 708.

Machine learning API 706 may be configured to receive data from a plate detection database 714, and receive data from, for example, a license plate detector 712. License plate detector 712 may be configured to receive an image stream from a license plate detection camera 724 via an Internet-based network 722.

Machine learning API 706 may be used to generate a machine learning model 755. Model 755 may be trained and validated using a training/validation API 710.

The trained and validated model may be accessible to users 734 via an Internet-based network 732 and a dashboard core API 702. Dashboard core API 702 may use a core data base 703 for storing data.

Referring again to FIG. 5, in step 540, the decision support system applies the one or more data inputs to the data model to generate output data. The output data may include one or more of alarms, warnings, statistical information outputs, or one or more summaries or reports.

In step 550, the decision support system generates and displays a first visual representation of the output data. The visual representation may include a graphical representation of an alarm or a graphical representation of metrics and reports.

In step 560, the decision support system determines whether one or more new data inputs have been received from the any of the plurality of data input devices implemented across the industrial site. If it is determined in step 570, that the new data inputs have been received, then step 510 is performed. Otherwise, step 580 is performed, and the processing of the data inputs ends.

6. Safety Event Detection

Managing a large-scale industrial site often includes ensuring safety of the persons present on the site and near the site. The traditional approaches for monitoring the safety usually involve human visual observations by industrial-site managers. This is often inefficient because it requires an elevated level of mental focus and is prone to errors and distraction. These shortcomings are overcome in a decision support system presented herein.

In an embodiment, a decision support system is configured to transmit safety protocol messages and alert notifications to industrial-site managers. To achieve this, a safety component of the decision support system cooperates with two subcomponents: a process that is configured to detect humans, industrial equipment and machines, and an event detection process that processes the detected information.

Because safety in an industrials site is critical, one of the important tasks performed by a decision support system is analyzing alarms generated by the system and reducing a count of false alarms. When uncertain, the decision support system errs on the side of caution. When the safety of persons is involved, it is better to have a faster detection even if that causes generating some false alarms.

To support scalability, a decision support system deploys various algorithms to compensate for the fact that the cameras may have different fields of view and that there might be different visibility conditions.

In an embodiment, a decision support system implements persons and equipment detection algorithms, a machine learning system, and a computer vision system. The machine learning system allows detecting and processing features included in depictions of the persons detected within an industrial site. With respect to the equipment detection tasks, labels may be used to track the persons. Labeled data may be used to perform a computer simulation to track and account for the persons.

7. Persons and Equipment Detection

In an embodiment, a decision support system is configured to detect persons and equipment by employing a machine learning system. The machine learning system may be trained using a sequence of classifiers to label frames of video streams according to the presence or absence of an object. Even though there is no uniform classifier that is applicable to all possible datasets, a set of certain classifiers may be selected based on availability of the data, availability of the computational power, presence of the computational delay constraints, and empirical probability distribution of the data.

Figure 6:
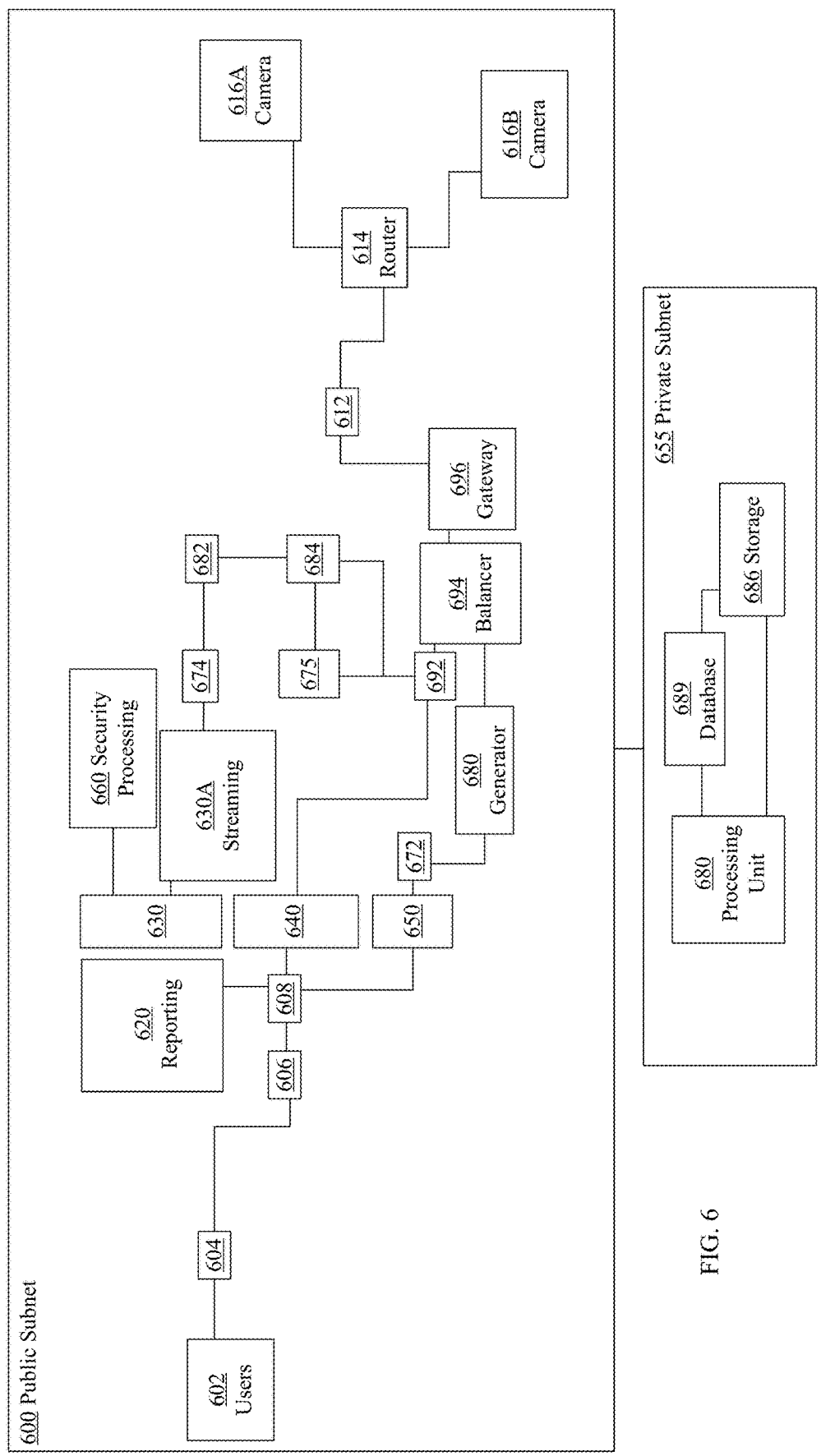
FIG. 6 depicts an example diagram for performing persons and equipment detection.

FIG. 6 depicts an example diagram for performing persons and equipment detection. The configuration depicted in FIG. 6 includes a public subnet 600 and a private subnet 655.

In public subnet 600, inputs to an object detection component of a decision support system may include digital images from one or more cameras 616A, 616B. The images may be routed via a router 614 to an Internet-based network 612, and then provided via an Internet gateway 696 to an elastic load balancer 694. Additional input may be provided by a time lapse generator 680 that is communicatively coupled to a relational database 672.

From elastic load balancer 694, the images may be provided to a transcoder 692, and then to an instance storage 675. From instance storage 675, the images may be provided to a recoding storage 684, which may provide the images to a lambda-parameter-correction processing 682 to normalize the color hues through the images to compensate for the different gamma characteristics of the image capturing devices. Then the images are stored in a relational database 674.

The images may be subjected to reporting 620, streaming 630A, 630, and security processing 660. The core processing is executed in a component 640 which, in addition to receiving the images, also receives data from a time-lapse reader 650 and a weather reader 670.

Users 602 may access the streaming process for displaying the generated outputs via an Internet network 604 and an Internet gateway 606.

In an embodiment, a decision support system employs techniques incorporating neural networks, vector machines, and combinations of different classifiers through boosting. Due to the complexity of each data point of, for example, a high-resolution image, and the availability of copious amounts of labeled data, the image processing starts with a neural network approach. The neural network approach may incorporate state-of-the-art software packages for deep learning to extract the features automatically rather than manually. This approach provides savings in terms of time and domain expertise. Examples of neural network may include convolutional neural networks that are efficient in performing in image recognition.

Detecting persons and equipment may also be performed in private subnet 655 comprising a processing unit 680, a bucket storage 686 and a relational database 689. Private subnet 655 may be used to provide auxiliary support to the public subnet described above.

Persons and machinery entering and leaving an industrial site may be tracked using cameras installed along an outside perimeter of the industrial site, along an inside perimeter of the industrial site, or along both perimeters.

Figure 10B:
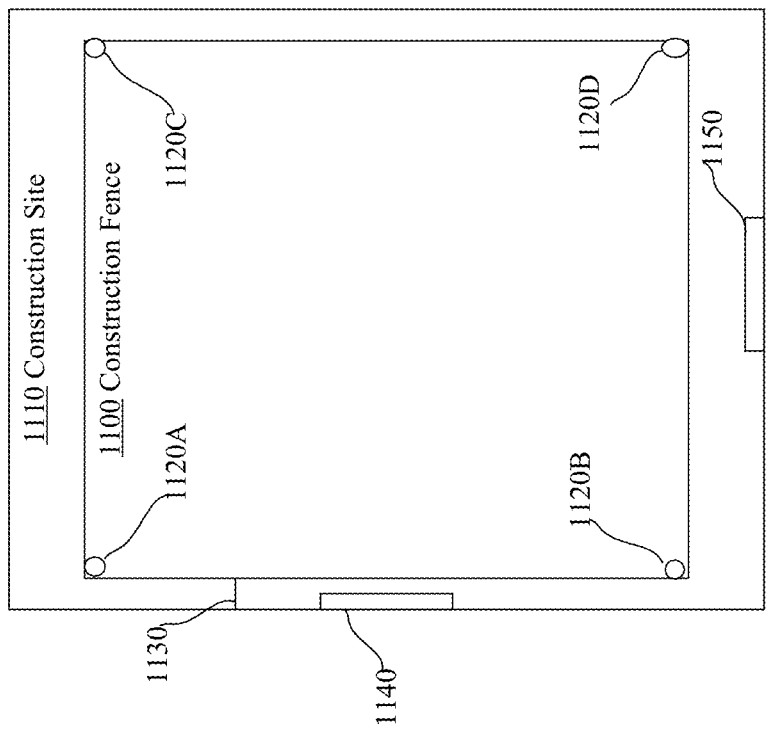
FIG. 10B schematically illustrates a top plan view of an example physical site that is equipped with cameras mounted along an inside perimeter of the physical site.
Figure 10A:
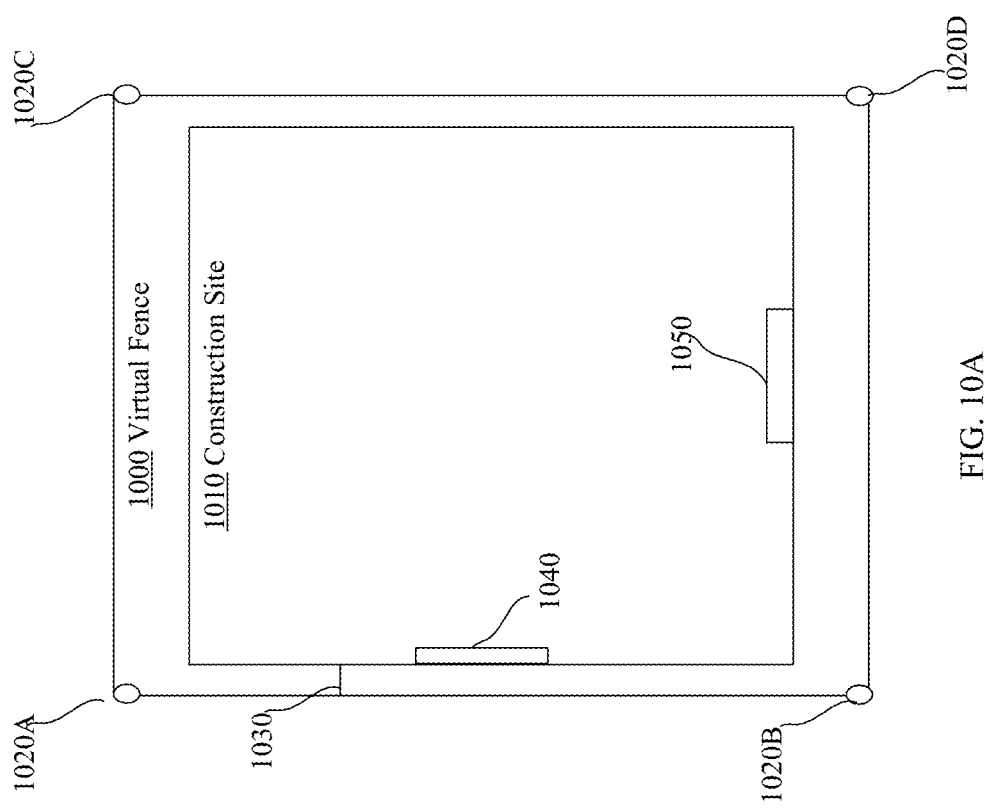
FIG. 10A schematically illustrates a top plan view of an example physical site that is equipped with cameras mounted along an outside perimeter of the physical site.
Figure 9B:
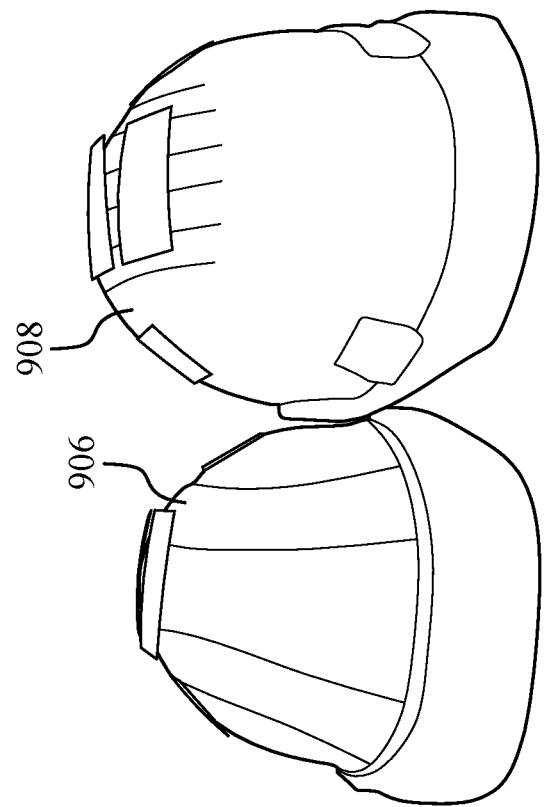
Figure 9A:
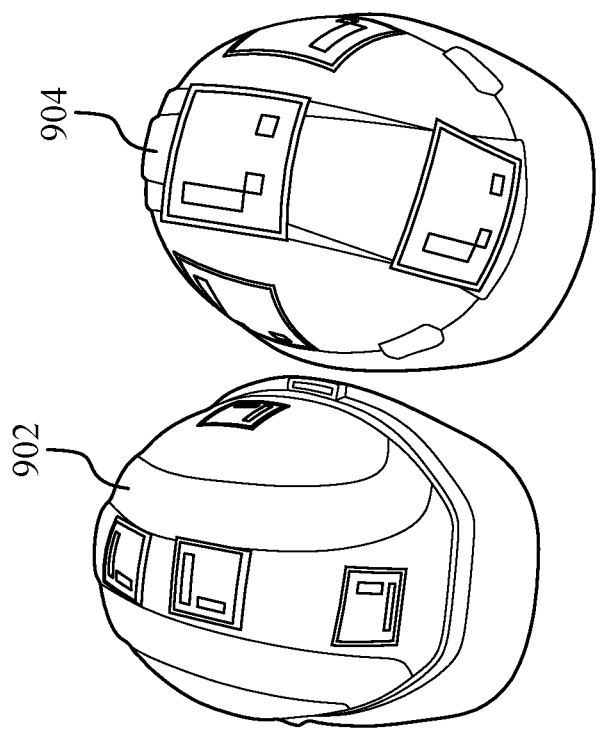

FIG. 10A schematically illustrates a top plan view of an example physical site that is equipped with cameras mounted along an outside perimeter of the physical site, while FIG. 10B schematically illustrates a top plan view of an example physical site that is equipped with cameras mounted along an inside perimeter of the physical site.

In the example of FIG. 10A, an industrial site 1010 has one or more entrances 1040 and one or more gates 1050. Although not depicted in FIG. 10A, industrial site 1010 may also include doors, windows, fences, tunnels, and the like.

In an embodiment, one or more cameras 1020A, 1020B, 1020C, 1020D are installed at industrial site 1010 to capture digital images and video streams of persons or activities crossing at the entrances and gates of industrial site 1010. Cameras 1020A, 1020B, 1020C, 1020D in FIG. 10A may correspond to video cameras 616 in FIG. 6. Cameras 1020A, 1020B, 1020C, 1020D may be installed along an outside perimeter of industrial site 1010 at specific points that allow the cameras to capture images of persons or pieces of equipment as they pass through entrances 1040 and/or gates 1050.

In an embodiment, the cameras are positioned to capture images within a polygon that is spaced apart by a specified distance 1030 outside of industrial site 1010. The cameras may be positioned to capture images of persons or pieces of equipment passing through a virtual boundary that surrounds industrial site 1010. The virtual boundary may be either outside or inside industrial site 1010. An outside boundary may be plotted, for example, one meter outside of industrial site 1010. In this arrangement, a collective field of view of the cameras defines a virtual fence 1000 or a virtual boundary around industrial site 1010, and cameras capture images of persons and equipment crossing virtual fence 1000 to either enter industrial site 1010 or leave industrial site 1010.

While the cameras in FIG. 10A are installed outside the industrial site, other cameras may be installed inside the industrial site, or both outside and inside.

In FIG. 10B, the cameras are installed inside an industrial site 1100. In the example of FIG. 10B, industrial site 1110 has one or more entrances 1140 and one or more gates 1150. Although not depicted in FIG. 10B, industrial site 1110 may also include doors, windows, fences, tunnels, and the like.

In an embodiment, one or more cameras 1120A, 1120B, 1120C, 1120D are installed along a virtual fence 1100 to capture digital images or video streams of persons or activities occurring in the site. Cameras 1120A, 1120B, 1120C, 1120D in FIG. 10B may correspond to video cameras 616 in FIG. 6.

One or more cameras may be installed at corners of industrial site 1010/1110, or along the sides of industrial site 1010/1110. For example, two cameras may be installed at a particular location along a virtual boundary surrounding industrial site 1010/1110: one camera may be installed on a pole one meter above the ground, and another camera may be installed on the same pole two meters above the ground. For example, one camera may be configured to monitor trucks entering and leaving the site, while another camera may be configured to monitor the workers.

In an embodiment, the cameras are positioned along industrial fence 1100 that is inside industrial site 1110 and separate from industrial site 1110 by a specified distance 1130 from industrial site 1110. In this arrangement, the collective field of view of the cameras defines virtual fence 1100 or a virtual boundary inside industrial site 1110 and cameras capture images of persons and pieces of equipment entering or leaving industrial site 1110 as they cross industrial fence 1100.

In industrial sites, each person moving inside a virtual or industrial fence is expected to wear a hard hat, apparel, or an item bearing indicia that can be seen in a digital image or digital video frames, and recognizable using digital image recognition techniques. Assume, for example, that each person working on site 1010/1110 wears a hard hat bearing a barcode, a QR code or other marker that can be recognized in a digital image depicting a person. As a person crosses the virtual boundary to enter site 1010/1110, an image of the person is captured by a camera and transmitted to, for example, computer 110 depicted in FIG. 1. Computer 110 processes the image and detects the marker. Based on the detected marker, computer 110 may increment a count of workers present on site 1010/1110. Later, when a person crosses the virtual boundary to leave site 1010/1110, an image of the person is captured by a camera and transmitted to, for example, computer 110 depicted in FIG. 1. Computer 110 processes the image and detects the marker. Based on the detected marker, computer 110 may decrement the count of workers present on site 1010/1110. This technique allows to determine accurate worker-counts working on site 1010/1110 at a given time. A similar technique may be used to count pieces of equipment and to count trucks entering and leaving site 1010/1110.

In an embodiment, markers attached to hard hats or overalls that workers are wearing are color-coded. The color-coded markers may uniquely identify the workers or the workers' trades. Examples of trades may include plumbers, carpenters, electricians, glassers, and the like. The trades may have assigned different color markers, and the different color markers may be attached to the workers' hard hats.

Suppose that site 1010 requires that all plumbers working on site 1010 wear hard hats with red markers, and that all carpenters working on site 1010 wear hard hats with white markers. The cameras installed throughout site 1010 capture images of the workers present on site 1010 and transmit the captured images to computer 110. Computer 110 may analyze the images, and detect the markers attached to the hard hats worn by the workers depicted in the images. Computer 110 may analyze the colors of the detected markers and based on the detected colors, computer 110 may determine counts of workers that belong to different trades.

In an embodiment, hard hats that workers are wearing are color-coded. The color-coded hats may uniquely identify the workers or the workers' trades. The trades may have assigned different color hats.

Suppose that site 1010 requires that all electricians working on site 1010 wear white hard hats, and that all glaziers working on site 1010 wear red hard hats. The cameras installed throughout site 1010 capture images of the workers present on site 1010 and transmit the captured images to computer 110. Computer 110 may analyze the image, and detect the hard hats worn by the workers depicted in the images. Computer 110 may analyze the colors of the detected hard hats and based on the detected colors, computer 110 may determine counts of workers that belong to different trades.

A count of workers that belong to a particular trade may be increased when computer 110 receives an image depicting a worker who belongs to the particular trade and who is entering site 1010/1110.

A count of workers that belong to a particular trade may be decreased when computer 110 receives an image depicting a worker who belongs to the particular trade and who is leaving site 1010/1110.

In an embodiment, counts of workers that belong to different trades may be timestamped, and the timestamped counts may be used to determine how many workers of the different trades worked on site 1010/1110 at a given time.

Figure 9A:
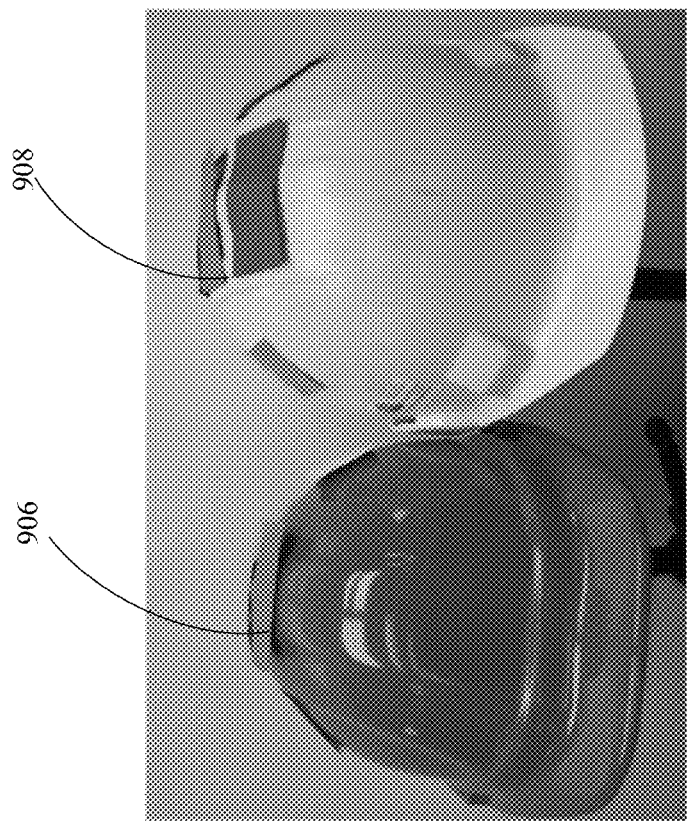
FIG. 9A and FIG. 9B depict example markers that can be affixed to hard hats.
Figure 9B:
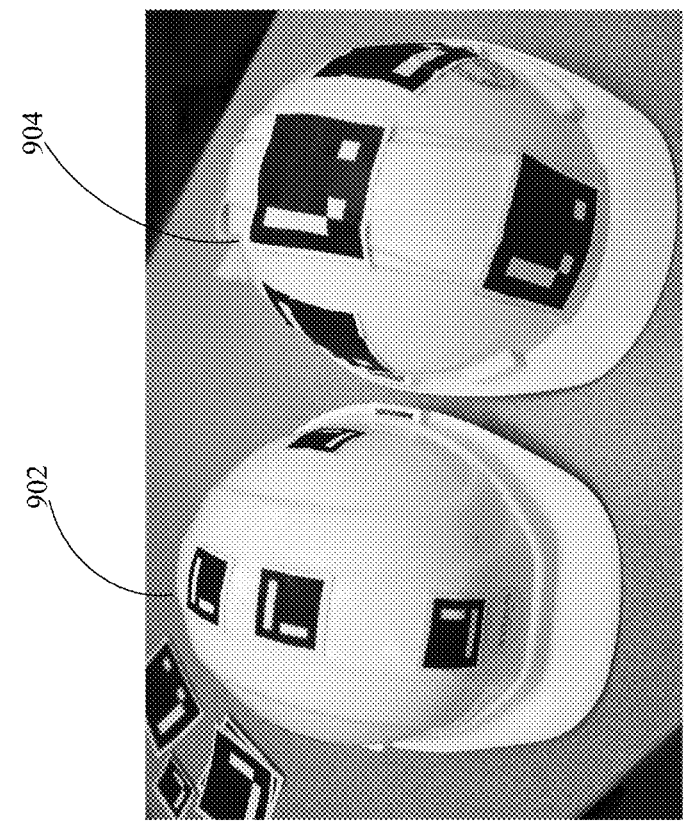

FIG. 9A and FIG. 9B depict examples of markers, or stickers, affixed to hard hats. FIG. 9A depicts an example of black and white markers. FIG. 9B depicts an example of color-coded markers. Other types of markers may also be implemented. The hard hats themselves may be also color-coded.

Color-coded markers and color-coded hard hats may be used to count the worker trades present on an industrial site. The counting may be performed in many different ways. For example, if different hard hat colors are assigned to different trades, then a count of worker trades may be computed based on the detected hat colors. However, if different marker colors are assigned to different worker trades, then a count of worker trades may be computed based on the detected marker colors.

The counts may be also computed based on a combination of the hard hat colors and the marker colors. For instance, if the electricians wear blue hard hats with black markers, then a count of the electricians present on the industrial site may be computed based on the detected blue hard hats with black markers.

Cameras 1020A, 1020B, 1020C, 1020D may be configured to capture depictions of the workers as the workers enter industrial site 1010 and as the workers leave industrial site 1010. The captured images may be timestamped and provided to a decision support system for processing. The processing may include determining the times at which each individual worker, or a group of workers belonging to the same trade, entered industrial side 1010 and left the site. The processing may also include determining the time periods during which the workers, or the groups of workers, were present on industrial site 1010, and the time periods during which the workers or groups of workers were absent from the site.

In addition to tracking whereabouts of the workers, a decision support system may be configured to track the industrial equipment. The equipment may include delivery trucks, loaders, excavators, backhoes, bulldozers, dump trucks, cement mixers, cranes, and others. The tracking may be performed by monitoring and capturing images of license plates or markers attached to the trucks. For example, the trucks may have attached markers at, for example, license plates or front grilles, and cameras 1020A, 1020B, 1020C, 1020D may be configured to capture the images for the markers attached on the trucks.

8. Event Detection

In an embodiment, a decision support system is configured to recognize one or more types of events that the system needs to detect or track. The types of the events may be defined by the type of sensors used to provide the event-and-sensor specific measurements.

In an embodiment, each event type is associated with a corresponding action. An action may correspond to, for example, generating a push-notification alarm, generating a message for an industrial manager, or displaying a message on the manager's portable device such as a smartphone.

In an embodiment, a decision support system is configured to detect a variety of events. Examples of the events include a collision event between machineries, a collision between a worker and a piece of equipment, an incident when a piece of equipment encroached on a forbidden zone, and an incident when a worker fell or got injured on the industrial site.

A decision support system may be configured to apply different detection algorithms to different types of events. For example, detecting a collision may be performed by employing a combination of geolocation-based algorithms and regression-based algorithms. On the other hand, detecting the equipment failure or an anomaly may be performed by employing a changepoint detection algorithm.

In an embodiment, a decision support system implements an alert user interface. The user interface may be configured to generate and display visual and audio alerts, as well as providing interactivity mechanisms enabling interactions between users and the decision support system. Enabling the interactions may include generating and providing the functionalities to allow the users to submit inputs to the decision support system, control tasks executed by the decision support system, and receive results from the decision support system. A user interface may be ergonomically adaptable to allow communicating with the decision support system in any type of safe and unsafe situations.

In an embodiment, a user interface is programmed to display outputs generated by a decision support system in the form that is easy to understand by users. The outputs may be customized to portable devices that have limited display space.

Figure 8:
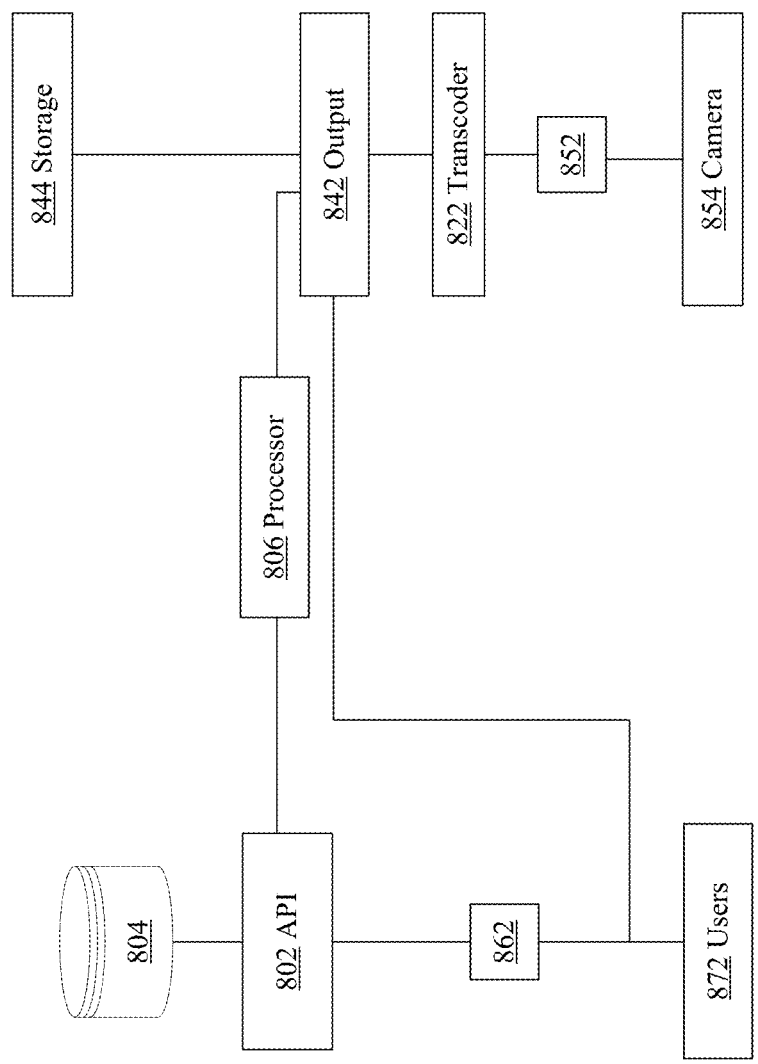
FIG. 8 depicts a deployment example of a decision support system.

FIG. 8 depicts a deployment example of a decision support system. In the depicted example, an IP camera 854 is deployed. IP camera 854 may be configured to generate one or more video streams comprising video frames that are captured by the camera and depict persons, assets, and events detected by the camera.

The video streams may be communicated from IP camera 854 via an Internet-based network 852 to a local transcoder service 822. Local transcoder service 822 may be configured to process the frames in the video streams and timestamp the frames. Output 842 generated by local transcoder service 822 may be provided via an Internet-based network 862 to users 872. Output 842 may also be stored in a long-term storage 844.

Output 842 generated by local transcoder service 822 may also be provided to an image-lambda-correction processor 806 that is configured to compensate for the image hue and saturation for different lambda-based characteristics of image capturing devices.

Output generated by image-lambda-correction processor 806 may be provided to a decision support system API 802 and stored in a storage device 804. Users 872 may access decision support system API 802 via Internet-based network 862 described above.

9. Efficiency Decision Support

In an embodiment, a decision support system is configured to receive real-time measurements from sensors strategically placed on an industrial site and return one or more efficiency or productivity metrics and recommendations. The metrics may provide summaries of the progress of the industrial project and allow decision makers to dynamically modify parameters of the industrial project. Providing the functionalities to dynamically modify the project's parameters may result in significant monetary savings that otherwise would not be attainable.

Example recommendations may include recommendations for different industrial resources such as equipment and manpower or resources for specific days and time periods.

Examples of metrics may include metrics that were derived by applying statistical estimation and regression approaches to data received from cameras, sensors, and a machine learning system. The metrics may also include metrics derived by applying dynamic programming approaches such as Markov decision processes.

An efficiency metric for an industrial project may be determined by comparing multiple metrics generated by a decision support system. The comparing may include comparing the pay-rates of workers, the rates of raw material used, the disturbance of road traffic nearby, and the rates of progress of the industrial work. Some of the metrics may be estimated, whereas others may be assessed manually.

For each of the metrics, a proper time scale may be defined. The time scale defines the estimation granularity. For example, the amount of manpower may be estimated for each day, whereas the amount of raw materials may be estimated at an hour-by-hour resolution. To estimate the amount of manpower spent, a detection algorithm may be used to obtain sample counts of workers detected at different times of the day and by different cameras. A mathematical model with so called sampling with replacement may be used to estimate a count of the workers present on an industrial site. The approach with the sampling with replacement has may advantages, including preserving the privacy of individual workers and assigning distinct labels to the workers.

Deep excavation is an important part of most industrial projects. To begin estimating an amount of raw materials that are required to perform the deep excavation, a decision support system may measure the amount of dirt-material removed from an industrial site by trucks. Furthermore, a machine learning model that has been trained on historical data may be used. For example, an equipment-detection algorithm and a regression-based computer vision algorithm may be applied to the collected data. According to another approach, a use of a raw materials may be estimated using a count of scoops made by an excavator. The counts of scoops may be determined using a computer vision system configured to detect different poses of the excavator and configured to detect events corresponding to forward and backward movements of the excavator.

City and infrastructure inspectors usually require the contractors working on an industrial site to generate as little vehicular traffic in the site as possible. Some cities even ask the contractors to pay fees to the city for the hours of lane closures, and for the large delays in travel times of public buses. To provide a measure of the impact that the industrial projects may have on transportation on the nearby roads, a decision support system may generate an industrial-impact metric. Determining that metric may include counting one or more distinct vehicles that are depicted in video frames captured by cameras pointing toward the roads near the industrial site. By comparing time series of the counts collected at different days, the decision support system may estimate the effect that the industrial project may have on the nearby traffic. According to another approach, a decision support system may determine a metric indicating the impact that the industrial has on timeliness of the public busses. In this approach, cameras may be used to collect video streams for an industrial site, and the decision support system may process the streams to detect one or more public busses, and to compute delays between the timestamps indicating the times when the busses were detected, and the times scheduled for the busses' arrivals and departures.

A decision support system may perform an efficiency analysis at a much slower time pace than a safety analysis is usually performed. For example, the efficiency analysis may be performed during otherwise idle computer cycles, and during hours when only few persons are present on the industrial site (e.g., at night).

10. Accountability

In an embodiment, a decision support system is configured to record data from a plurality of sensors strategically installed throughout an industrial site. Recording the data is customized to provide support the communications and storage requirements, while satisfying security and image quality objectives.

A decision support system keeps records of activities on an industrial site as evidence and does so for many reasons. The records may be used to, for example, determine the causes of events such as incidents involving civilians. For instance, it is important to detect the pedestrian who fell or got injured on the site or detect whether a pedestrian got injured because of the industrial equipment. Typically, an industrial company is liable for any incidents that happened to the public within the industrial zones. An industrial zone usually includes a few hundred feet of publicly accessible roadway beyond the actual site of the industrial.

Records of critical incidents may provide evidence to an industrial company and may be used to quickly resolve lawsuits. The records of the incidents may allow the industrial company to prepare their cases before a lawsuit against the company is even filed. The records also allow the industrial company to be proactive and correct problems by providing, for example, safer roads and surroundings along the sites.

A decision support system may maintain the records of activities on an industrial site as evidence for auditing purposes. After reviewing the recordings, the industrial site operator may audit the equipment rental fees charged by subcontractors against the actual usage of the equipment. To do so, the operator may review timestamped screenshots depicting drilling rigs, buses, cranes, or excavators entering and leaving the industrial site. Furthermore, the industrial company may cross check the number of workers billed against the number of workers invoiced. The audits may be triggered when, for example, an invoice deviates excessively from the previous invoices, and when significant overtime charges appear on the invoices. The activity records may also be used to prevent corruption through the risk of discovery.

11. Improvements Provided by Certain Embodiments

In an embodiment, a decision support system provides many functionalities that have been sought by major industrial companies. The system is valuable to the companies for many reasons, including improving safety on industrial sites, improving efficiency in tracking persons and equipment, improving accountability of subcontractors, and improving accountability to the city and citizens.

In an embodiment, a decision support system provides several economic benefits. Some of the direct benefits include the ability to commercialize and export the decision support system technology internationally. Some of the indirect benefits include the ability to address the frequent criticisms of industrial projects: high rate of incidents, inefficiency, and lack of accountability.

12. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 11 is a block diagram that illustrates an example computer system with which an embodiment may be implemented. In the example of FIG. 11, a computer system 1100 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1100 includes an input/output (I/O) subsystem 1102 which may include a bus and/or other communication mechanism(s) for communicating information and/or instructions between the components of the computer system 1100 over electronic signal paths. The I/O subsystem 1102 may include an I/O controller, a memory controller and at least one I/O port. The electronic signal paths are represented schematically in the drawings, for example as lines, unidirectional arrows, or bidirectional arrows.

At least one hardware processor 1104 is coupled to I/O subsystem 1102 for processing information and instructions. Hardware processor 1104 may include, for example, a general-purpose microprocessor or microcontroller and/or a special-purpose microprocessor such as an embedded system or a graphics processing unit (GPU) or a digital signal processor or ARM processor. Processor 1104 may comprise an integrated arithmetic logic unit (ALU) or may be coupled to a separate ALU.

Computer system 1100 includes one or more units of memory 1106, such as a main memory, which is coupled to I/O subsystem 1102 for electronically digitally storing data and instructions to be executed by processor 1104. Memory 1106 may include volatile memory such as various forms of random-access memory (RAM) or other dynamic storage device. Memory 1106 also may be used for storing temporary variables or other intermediate information during execution of instructions to be executed by processor 1104. Such instructions, when stored in non-transitory computer-readable storage media accessible to processor 1104, can render computer system 1100 into a special-purpose machine that is customized to perform the operations specified in the instructions.

Computer system 1100 further includes non-volatile memory such as read only memory (ROM) 1108 or other static storage device coupled to I/O subsystem 1102 for storing information and instructions for processor 1104. The ROM 1108 may include various forms of programmable ROM (PROM) such as erasable PROM (EPROM) or electrically erasable PROM (EEPROM). A unit of persistent storage 1110 may include various forms of non-volatile RAM (NVRAM), such as FLASH memory, or solid-state storage, magnetic disk or optical disk such as CD-ROM or DVD-ROM and may be coupled to I/O subsystem 1102 for storing information and instructions. Storage 1110 is an example of a non-transitory computer-readable medium that may be used to store instructions and data which when executed by the processor 1104 cause performing computer-implemented methods to execute the techniques herein.

The instructions in memory 1106, ROM 1108 or storage 1110 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1100 may be coupled via I/O subsystem 1102 to at least one output device 1112. In one embodiment, output device 1112 is a digital computer display. Examples of a display that may be used in various embodiments include a touch screen display or a light-emitting diode (LED) display or a liquid crystal display (LCD) or an e-paper display. Computer system 1100 may include other type(s) of output devices 1112, alternatively or in addition to a display device. Examples of other output devices 1112 include printers, ticket printers, plotters, projectors, sound cards or video cards, speakers, buzzers or piezoelectric devices or other audible devices, lamps or LED or LCD indicators, haptic devices, actuators or servos.

At least one input device 1114 is coupled to I/O subsystem 1102 for communicating signals, data, command selections or gestures to processor 1104. Examples of input devices 1114 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1116, which may perform cursor control or other automated control functions such as navigation in a graphical interface on a display screen, alternatively or in addition to input functions. Control device 1116 may be a touchpad, a mouse, a trackball, or cursor direction keys for communicating direction information and command selections to processor 1104 and for controlling cursor movement on display 1112. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1114 may include a combination of multiple different input devices, such as a video camera and a depth sensor.

In another embodiment, computer system 1100 may comprise an internet of things (IoT) device in which one or more of the output device 1112, input device 1114, and control device 1116 are omitted. Or, in such an embodiment, the input device 1114 may comprise one or more cameras, motion detectors, thermometers, microphones, seismic detectors, other sensors or detectors, measurement devices or encoders and the output device 1112 may comprise a special-purpose display such as a single-line LED or LCD display, one or more indicators, a display panel, a meter, a valve, a solenoid, an actuator or a servo.

When computer system 1100 is a mobile computing device, input device 1114 may comprise a global positioning system (GPS) receiver coupled to a GPS module that is capable of triangulating to a plurality of GPS satellites, determining and generating geo-location or position data such as latitude-longitude values for a geophysical location of the computer system 1100. Output device 1112 may include hardware, software, firmware and interfaces for generating position reporting packets, notifications, pulse or heartbeat signals, or other recurring data transmissions that specify a position of the computer system 1100, alone or in combination with other application-specific data, directed toward host 1124 or server 1130.

Computer system 1100 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1100 in response to processor 1104 executing at least one sequence of at least one instruction contained in main memory 1106. Such instructions may be read into main memory 1106 from another storage medium, such as storage 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1110. Volatile media includes dynamic memory, such as memory 1106. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1102. Transmission media can also take the form of acoustic or light waves, such as those generated during radio-wave and infra-red data communications.

Various forms of media may be involved in carrying at least one sequence of at least one instruction to processor 1104 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1100 can receive the data on the communication link and convert the data to a format that can be read by computer system 1100. For instance, a receiver such as a radio frequency antenna or an infrared detector can receive the data carried in a wireless or optical signal and appropriate circuitry can provide the data to I/O subsystem 1102 such as place the data on a bus. I/O subsystem 1102 carries the data to memory 1106, from which processor 1104 retrieves and executes the instructions. The instructions received by memory 1106 may optionally be stored on storage 1110 either before or after execution by processor 1104.

Computer system 1100 also includes a communication interface 1118 coupled to bus 1102. Communication interface 1118 provides a two-way data communication coupling to network link(s) 1120 that are directly or indirectly connected to at least one communication networks, such as a network 1122 or a public or private cloud on the Internet. For example, communication interface 1118 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1122 broadly represents a local area network (LAN), wide-area network (WAN), campus network, internetwork or any combination thereof. Communication interface 1118 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1118 sends and receives electrical, electromagnetic or optical signals over signal paths that carry digital data streams representing various types of information.

Network link 1120 typically provides electrical, electromagnetic, or optical data communication directly or through at least one network to other data devices, using, for example, satellite, cellular, Wi-Fi, or BLUETOOTH technology. For example, network link 1120 may provide a connection through a network 1122 to a host computer 1124.

Furthermore, network link 1120 may provide a connection through network 1122 or to other computing devices via internetworking devices and/or computers that are operated by an Internet Service Provider (ISP) 1126. ISP 1126 provides data communication services through a world-wide packet data communication network represented as internet 1128. A server computer 1130 may be coupled to internet 1128. Server 1130 broadly represents any computer, data center, virtual machine or virtual computing instance with or without a hypervisor, or computer executing a containerized program system such as DOCKER or KUBERNETES. Server 1130 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1100 and server 1130 may form elements of a distributed computing system that includes other computers, a processing cluster, server farm or other organization of computers that cooperate to perform tasks or execute applications or services. Server 1130 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1130 may comprise a web application server that hosts a presentation layer, application layer and data storage layer such as a relational database system using structured query language (SQL) or no SQL, an object store, a graph database, a flat file system or other data storage.

Computer system 1100 can send messages and receive data and instructions, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage 1110, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, instantiating several instances of the same program often means more than one process is being executed. Multitasking may be implemented to allow multiple processes to share processor 1104. While each processor 1104 or core of the processor executes a single task at a time, computer system 1100 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

13. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
using a computing device, receiving a plurality of data inputs from a plurality of data input devices in an industrial site;
identifying, in the plurality of data inputs, a plurality of digital images depicting workers working on the industrial site;
detecting a plurality of color-coded objects depicted in the plurality of digital images;
wherein detecting a plurality of color-coded objects in the plurality of digital images includes one or more of: detecting colors of hard hats indicating worker trades and depicted in the plurality of digital images, detecting markers attached to hard hats indicating worker trades and depicted in the plurality of digital images, or detecting any other color-coded indicia embedded on hard hats indicating worker trades and depicted in the plurality of digital images;
based on the color-coded objects, determining a plurality of worker counts of workers that belong to different trades;
using the computing device, obtaining access to a data model that has been trained on training data for the industrial site and that is programmed to detect one or more anomalies associated with workers or equipment at the industrial site;
using the computing device, applying the plurality of data inputs and the plurality of worker counts to the data model and evaluating the data model with the data inputs to result in receiving output data specifying whether the plurality of data inputs and the plurality of worker counts indicate one or more anomalies occurring in the industrial site;
using the computing device, in response to determining that the output data indicates a first set of anomalies, of the one or more anomalies:
generating a first set of notifications that corresponds to the first set of anomalies occurring in the industrial site;
for each first anomaly of the first set of anomalies:
generating a first notification that includes a description of a first anomaly of the first set of anomalies;
determining one or more first recipients of the first notification;
transmitting the first notification to the one or more first recipients.

2. The computer-implemented method of claim 1, wherein the first set of anomalies includes one or more of: a safety alarm, a productivity drop, a schedule slippage, an anomaly based on past performance, an alarm for a frequent event, a performance alarm, an alarm for a rare event, an alarm for a safety issue, an alarm for a misappropriation event, or an alarm for an accident event;
wherein the method further comprises:

applying the plurality of data inputs to the data model to generate a set of performance metrics for the industrial site;

for each performance metrics of the set of performance metrics:

generating a second notification including a performance metrics;

determining one or more second recipients of the performance metrics;

transmitting the second notification to the one or more second recipients;

wherein the set of performance metrics for the industrial site includes one or more of: a metric for amounts of material moved to and from the industrial site, an efficiency metric, a performance metric, a work schedule delay metric, a delivery schedule delay metric, a cost efficiency metric, or a worker absenteeism metric.

3. The computer-implemented method of claim 2, further comprising:

based on the set of performance metrics, determining whether any metrics of the set of performance metrics indicates inefficiencies;

in response to determining that one or more metrics of the set of performance metrics indicate inefficiencies:

determining, based on the set of performance metrics, one or more reasons for the inefficiencies;

transmitting a third notification that includes descriptions of the one or more reasons for the inefficiencies.

4. The computer-implemented method of claim 3, further comprising:

generating a third notification including the plurality of worker counts;

determining one or more third recipients of the third notification;

transmitting the third notification to the one or more third recipients;

wherein the one or more third recipients include one or more of: an authorized agent of the industrial site, an operator of the industrial site, or an accountant of the industrial site.

5. The computer-implemented method of claim 4, further comprising:

based on one or more of: the first set of anomalies for the industrial site, the set of performance metrics for the industrial site, the one or more reasons for inefficiencies, or the plurality of digital images, determining new requirements for the data model;

wherein the new requirements for the data model include one or more of: requirements for an amount of accuracy achieved in various outputs of the data model, requirements for an ability to preserve a privacy of workers, requirements for a speed at which various outputs are generated by the data model, requirements for a scalability of the data model to various industrial sites, or requirements for a cost of deploying and maintaining the data model;

wherein the industrial site includes one or more of: an indoor industrial site, an outdoor industrial site, a construction site, or an underground industrial site.

6. The computer-implemented method of claim 1, the method further comprising:

receiving an additional plurality of new data inputs from the plurality of data input devices implemented across the industrial site;

generating a new set of safety alarms for the industrial site, a new set of performance metrics for the industrial site, one or more new reasons for inefficiencies, and a new set of permanent video recordings and other sensor data for accountability verification;

based on one or more of: the new set of safety alarms for the industrial site, the new set of performance metrics for the industrial site, the one or more new reasons for inefficiencies, or the new set of permanent video recordings and other sensor data for accountability verification, updating requirements for the data model.

7. The computer-implemented method of claim 1, wherein the plurality of data inputs is received from the plurality of data input devices which include one or more of: video cameras, digital cameras, or digital sensors;

wherein the plurality of data input devices includes devices deployed at various locations of the industrial site;

wherein the plurality of data input devices provides the plurality of data inputs via one or more of: power cables, Wi-Fi networks, Internet-based networks, local-area networks (LANs), wide area network (WANs), or private networks.

8. The computer-implemented method of claim 1, further comprising:

detecting a second plurality of second color-coded objects depicted in the plurality of digital images;

wherein detecting a second plurality of second color-coded objects in the plurality of digital images includes one or more of: detecting color-coded stickers attached to material packaging indicating material types and depicted in the plurality of digital images, detecting color-coded stickers attached to material finishes indicating finishes types and depicted in the plurality of digital images, detecting color-coded stickers attached to material packaging indicating progress stage types and depicted in the plurality of digital images, detecting color-coded stickers attached to material finishes indicating progress stage types and depicted in the plurality of digital images;

based on the second color-coded objects, determining a plurality of material counts, a plurality of finishes counts and a plurality of progress stage types;

using the computing device, obtaining access to a data model that has been trained on training data for the industrial site and that is programmed to detect one or more anomalies associated with workers or equipment at the industrial site;

using the computing device, applying the plurality of data inputs, the plurality of material counts, the plurality of finishes counts and the plurality of progress stage types to the data model and evaluating the data model with the data inputs to result in receiving output data specifying whether one or more second anomalies are occurring in the industrial site;

using the computing device, in response to determining that the output data indicates the one or more second anomalies, generating and transmitting one or more second alerts.

9. A computer system comprising one or more processors, one or more non-transitory digital storage media coupled to the processors and storing one or more sequences of program instructions which, when executed using the one or more processors, cause the one or more processors to perform:

using a computing device, receiving a plurality of data inputs from a plurality of data input devices in an industrial site;

identifying, in the plurality of data inputs, a plurality of digital images depicting workers working on the industrial site;

detecting a plurality of color-coded objects depicted in the plurality of digital images;

wherein detecting a plurality of color-coded objects in the plurality of digital images includes one or more of: detecting colors of hard hats indicating worker trades and depicted in the plurality of digital images, detecting markers attached to hard hats indicating worker trades and depicted in the plurality of digital images, or detecting any other color-coded indicia embedded on hard hats indicating worker trades and depicted in the plurality of digital images;

based on the color-coded objects, determining a plurality of worker counts of workers that belong to different trades;

using the computing device, obtaining access to a data model that has been trained on training data for the industrial site and that is programmed to detect one or more anomalies associated with workers or equipment at the industrial site;

using the computing device, applying the plurality of data inputs and the plurality of worker counts to the data model and evaluating the data model with the data inputs to result in receiving output data specifying whether the plurality of data inputs and the plurality of worker counts indicate one or more anomalies occurring in the industrial site;

using the computing device, in response to determining that the output data indicates a first set of anomalies, of the one or more anomalies:

generating a first set of notifications that corresponds to the first set of anomalies occurring in the industrial site;

for each first anomaly of the first set of anomalies:
    generating a first notification that includes a description of a first anomaly of the first set of anomalies;
    determining one or more first recipients of the first notification;
    transmitting the first notification to the one or more first recipients.

10. The computer system of claim 9,
wherein the first set of anomalies includes one or more of: a safety alarm, a productivity drop, a schedule slippage, an anomaly based on past performance, an alarm for a frequent event, a performance alarm, an alarm for a rare event, an alarm for a safety issue, an alarm for a misappropriation event, or an alarm for an accident event;

wherein the computer system stores additional instructions for:

applying the plurality of data inputs to the data model to generate a set of performance metrics for the industrial site;

for each performance metrics of the set of performance metrics:

generating a second notification including a performance metrics;

determining one or more second recipients of the performance metrics;

transmitting the second notification to the one or more second recipients;

wherein the set of performance metrics for the industrial site includes one or more of: a metric for amounts of material moved to and from the industrial site, an efficiency metric, a performance metric, a work schedule delay metric, a delivery schedule delay metric, a cost efficiency metric, or a worker absenteeism metric.

11. The computer system of claim 10, storing additional program instructions for:

based on the set of performance metrics, determining whether any metrics of the set of performance metrics indicates inefficiencies;

in response to determining that one or more metrics of the set of performance metrics indicate inefficiencies:

determining, based on the set of performance metrics, one or more reasons for the inefficiencies;

transmitting a third notification that includes descriptions of the one or more reasons for the inefficiencies.

12. The computer system of claim 11, storing additional program instructions for:

generating a third notification including the plurality of worker counts;

determining one or more third recipients of the third notification;

transmitting the third notification to the one or more third recipients;

wherein the one or more third recipients include one or more of: an authorized agent of the industrial site, an operator of the industrial site, or an accountant of the industrial site.

13. The computer system of claim 12, storing additional program instructions for:

based on one or more of: the first set of anomalies for the industrial site, the set of performance metrics for the industrial site, the one or more reasons for inefficiencies, or the plurality of digital images, determining new requirements for the data model;

wherein the new requirements for the data model include one or more of: requirements for an amount of accuracy achieved in various outputs of the data model, requirements for an ability to preserve a privacy of workers, requirements for a speed at which various outputs are generated by the data model, requirements for a scalability of the data model to various industrial sites, or requirements for a cost of deploying and maintaining the data model;

wherein the industrial site includes one or more of: an indoor industrial site, an outdoor industrial site, a construction site, or an underground industrial site.

14. The computer system of claim 9, storing additional program instructions for:

receiving an additional plurality of new data inputs from the plurality of data input devices implemented across the industrial site;

generating a new set of safety alarms for the industrial site, a new set of performance metrics for the industrial site, one or more new reasons for inefficiencies, and a new set of permanent video recordings and other sensor data for accountability verification;

based on one or more of: the new set of safety alarms for the industrial site, the new set of performance metrics for the industrial site, the one or more new reasons for inefficiencies, or the new set of permanent video recordings and other sensor data for accountability verification, updating requirements for the data model.

15. The computer system of claim 9, wherein the plurality of data inputs is received from the plurality of data input devices which include one or more of: video cameras, digital cameras, or digital sensors;

wherein the plurality of data input devices includes devices deployed at various locations of the industrial site;

wherein the plurality of data input devices provides the plurality of data inputs via one or more of: power cables, Wi-Fi networks, Internet-based networks, local-area networks (LANs), wide area network (WANs), or private networks.

16. One or more non-transitory digital storage media storing one or more sequences of program instructions which, when executed using one or more processors, cause the one or more processors to perform:
using a computing device, receiving a plurality of data inputs from a plurality of data input devices in an industrial site;
identifying, in the plurality of data inputs, a plurality of digital images depicting workers working on the industrial site;
detecting a plurality of color-coded objects depicted in the plurality of digital images;
wherein detecting a plurality of color-coded objects in the plurality of digital images includes one or more of: detecting colors of hard hats indicating worker trades and depicted in the plurality of digital images, detecting markers attached to hard hats indicating worker trades and depicted in the plurality of digital images, or detecting any other color-coded indicia embedded on hard hats indicating worker trades and depicted in the plurality of digital images;
based on the color-coded objects, determining a plurality of worker counts of workers that belong to different trades;
using the computing device, obtaining access to a data model that has been trained on training data for the industrial site and that is programmed to detect one or more anomalies associated with workers or equipment at the industrial site;
using the computing device, applying the plurality of data inputs and the plurality of worker counts to the data model and evaluating the data model with the data inputs to result in receiving output data specifying whether the plurality of data inputs and the plurality of worker counts indicate one or more anomalies occurring in the industrial site;
using the computing device, in response to determining that the output data indicates a first set of anomalies, of the one or more anomalies:
generating a first set of notifications that corresponds to the first set of anomalies occurring in the industrial site;
for each first anomaly of the first set of anomalies:
generating a first notification that includes a description of a first anomaly of the first set of anomalies;
determining one or more first recipients of the first notification;
transmitting the first notification to the one or more first recipients.

17. The one or more non-transitory digital storage media of claim 16, storing additional instructions for:
wherein the first set of anomalies includes one or more of: a safety alarm, a productivity drop, a schedule slippage, an anomaly based on past performance, an alarm for a frequent event, a performance alarm, an alarm for a rare event, an alarm for a safety issue, an alarm for a misappropriation event, or an alarm for an accident event;
wherein the one or more non-transitory digital storage media store additional instructions for:
applying the plurality of data inputs to the data model to generate a set of performance metrics for the industrial site;
for each performance metrics of the set of performance metrics:
generating a second notification including a performance metrics;
determining one or more second recipients of the performance metrics;
transmitting the second notification to the one or more second recipients;
wherein the set of performance metrics for the industrial site includes one or more of: a metric for amounts of material moved to and from the industrial site, an efficiency metric, a performance metric, a work schedule delay metric, a delivery schedule delay metric, a cost efficiency metric, or a worker absenteeism metric.

18. The one or more non-transitory digital storage media of claim 17, storing additional program instructions for:
based on the set of performance metrics, determining whether any metrics of the set of performance metrics indicates inefficiencies;
in response to determining that one or more metrics of the set of performance metrics indicate inefficiencies:
determining, based on the set of performance metrics, one or more reasons for the inefficiencies;
transmitting a third notification that includes descriptions of the one or more reasons for the inefficiencies.

19. The one or more non-transitory digital storage media of claim 18, storing additional program instructions for:
generating a third notification including the plurality of worker counts;
determining one or more third recipients of the third notification;
transmitting the third notification to the one or more third recipients;
wherein the one or more third recipients include one or more of: an authorized agent of the industrial site, an operator of the industrials site, or an accountant of the industrial site.

20. The one or more non-transitory digital storage media of claim 19, storing additional program instructions for:
based on one or more of: the first set of anomalies for the industrial site, the set of performance metrics for the industrial site, the one or more reasons for inefficiencies, or the plurality of digital images, determining new requirements for the data model;
wherein the new requirements for the data model include one or more of: requirements for an amount of accuracy achieved in various outputs of the data model, requirements for an ability to preserve a privacy of workers, requirements for a speed at which various outputs are generated by the data model, requirements for a scalability of the data model to various industrial sites, or requirements for a cost of deploying and maintaining the data model;
wherein the industrial site includes one or more of: an indoor industrial site, an outdoor industrial site, a construction site, or an underground industrial site.

21. The one or more non-transitory digital storage media of claim 16, wherein the plurality of data inputs is received from the plurality of data input devices which include one or more of: video cameras, digital cameras, or digital sensors;
wherein the plurality of data input devices includes devices deployed at various locations of the industrial site;
wherein the plurality of data input devices provides the plurality of data inputs via one or more of: power cables, Wi-Fi networks, Internet-based networks, local-area networks (LANs), wide area network (WANs), or private networks.

\* \* \* \* \*

UNITED STATES PATENT AND TRADEMARK OFFICE
CERTIFICATE OF CORRECTION

| | |
|---|---|
| PATENT NO. | : 10,896,331 B2 |
| APPLICATION NO. | : 16/129699 |
| DATED | : January 19, 2021 |
| INVENTOR(S) | : Lai Him Matthew Man |

It is certified that error appears in the above-identified patent and that said Letters Patent is hereby corrected as shown below:

On the Title Page

Item (12), should read Man et al.

Item (72) INVENTOR: Please add --Mohammad Soltani, Toronto (CA)--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*